US012775456B2

(12) United States Patent
Brautbar et al.

(10) Patent No.: US 12,775,456 B2
(45) Date of Patent: Oct. 27, 2026

(54) SOURCE CODE SIMILARITY

(71) Applicant: CrowdStrike, Inc., Sunnyvale, CA (US)

(72) Inventors: Michael Avraham Brautbar, Wayland, MA (US); Manu Nandan, Frisco, TX (US)

(73) Assignee: CrowdStrike, Inc., Sunnyvale, CA (US)

( * ) Notice: Subject to any disclaimer, the term of this patent is extended or adjusted under 35 U.S.C. 154(b) by 185 days.

(21) Appl. No.: 18/464,095

(22) Filed: Sep. 8, 2023

(65) Prior Publication Data

US 2025/0085945 A1 Mar. 13, 2025

(51) Int. Cl.
*G06F 8/51* (2018.01)

(52) U.S. Cl.
CPC .................................... *G06F 8/51* (2013.01)

(58) Field of Classification Search
CPC ............................ G06F 8/70–77; G06F 8/34
See application file for complete search history.

(56) References Cited

U.S. PATENT DOCUMENTS

| | | | | |
|---|---|---|---|---|
| 9,798,884 | B1 | 10/2017 | Bishop, III et al. | |
| 10,091,222 | B1 * | 10/2018 | Langton | H04L 63/1441 |
| 10,817,604 | B1 | 10/2020 | Kimball et al. | |
| 11,366,901 | B2 | 6/2022 | Bishop, III et al. | |
| 11,470,100 | B1 | 10/2022 | Christian | |
| 12,164,867 | B1 * | 12/2024 | Goodsitt | G06F 40/194 |
| 2005/0216898 | A1 | 9/2005 | Powell, Jr. et al. | |
| 2008/0148225 | A1 * | 6/2008 | Sarkar | G06F 8/70 717/107 |

(Continued)

FOREIGN PATENT DOCUMENTS

| | | |
|---|---|---|
| CN | 109697162 | 4/2019 |
| CN | 113721978 | 11/2021 |
| WO | 2023028721 | 3/2023 |

OTHER PUBLICATIONS

Ding, Yangruibo, et al., "Towards Learning (Dis)-Similarity of Source Code from Program Contrasts", Proceedings of the 60th Annual Meeting of the Association for Computational Linguistics, vol. 1: Long Papers, pp. 6300-6312, May 22-27, 2022, Columbia University.

(Continued)

*Primary Examiner* — Duy Khuong T Nguyen
(74) *Attorney, Agent, or Firm* — Law Office of Scott P. Zimmerman, PLLC

(57) ABSTRACT

Automated source code similarity greatly improves computer functioning. Any source code file is evaluated with respect to publicly-available open source code. If the source code file is similar to the publicly-available open source code, then a computer system may be approved or authorized to perform any hardware/software operations associated with the source code file. Should, however, the source code file be dissimilar to the publicly-available open source code, then the hardware/software operations are blocked to prevent disclosure of the source code file. For example, read/write/input/output operations are blocked and/or network interfaces are disabled. Source code similarity thus thwarts suspicious activities that indicate misappropriation or exfiltration of the source code file.

20 Claims, 27 Drawing Sheets

(56) References Cited

U.S. PATENT DOCUMENTS

| | | | | |
|---|---|---|---|---|
| 2014/0109226 | A1* | 4/2014 | Diehl | G06F 21/554 726/22 |
| 2014/0165045 | A1* | 6/2014 | Calcagno | G06F 8/77 717/125 |
| 2016/0202972 | A1 | 7/2016 | Sass et al. | |
| 2016/0283214 | A1* | 9/2016 | Hill | G06F 16/1873 |
| 2018/0060224 | A1* | 3/2018 | Shavro | G06F 11/3672 |
| 2019/0102165 | A1* | 4/2019 | Kim | G06F 21/44 |
| 2019/0108355 | A1* | 4/2019 | Carson | G06N 3/09 |
| 2020/0167498 | A1 | 5/2020 | Pridgen | |
| 2022/0236984 | A1* | 7/2022 | Lee | G06F 8/751 |
| 2023/0041068 | A1 | 2/2023 | Starin et al. | |
| 2023/0177168 | A1 | 6/2023 | Chernov | |

OTHER PUBLICATIONS

Extended European Search Report mailed Dec. 23, 2024 for European Patent Application No. 24199000.1, 9 pages.
Applicant's Response to the Search Opinion submitted Sep. 10, 2025 for European Patent Application No. 24199000.1, 19 pages.

* cited by examiner

SOURCE CODE SIMILARITY

BACKGROUND

The subject matter described herein generally relates to computers and, more particularly, the subject matter relates to software engineering, to security arrangements, and to source code monitoring.

Misappropriation of source code is an ongoing problem. Theft or exfiltration of source code files reveals competitive secrets and results in significant loss. Indeed, the Commission on the Theft of American Intellectual Property recently reported that American companies have lost more than $300 billion dollars in revenue due to IP theft. Misappropriation of source code must be overcome.

SUMMARY

Automated source code similarity thwarts IP theft. A source code similarity service evaluates any source code file with respect to publicly-available open source code. In some examples, if the source code file is similar to the publicly-available open source code, then the source code similarity service notifies a cyber security agent of that similarity to the publicly-available open source code. Because the cyber security agent is installed on a client computer system, the cyber security agent may approve or authorize hardware/software operations associated with the source code file. However, if the source code similarity service notifies the cyber security agent that the source code file is dissimilar to, or unlike, the publicly-available open source code, then the cyber security agent may block any hardware/software operations involving the source code file. The cyber security agent blocks the hardware/software operations to prevent disclosure of the source code file. The client computer system is thus prevented from, for example, copying the source code file to a USB drive. The client computer system may also be prevented from emailing or texting the source file. The cyber security agent, in fact, may block any read/write/input/output operations and may disable network interfaces. The cyber security agent thus causes the computer system to deny suspicious activities that indicate misappropriation or exfiltration of the source code file.

File centrality also identifies important source code files. When the source code file is evaluated, version control information may be retrieved. The version control information or other data is used to determine a file centrality importance associated with the source code file. The version control information allows a file centrality service to identify source code of high importance, such as programming crown jewels. The file centrality service uses the version control information to determine important source code files. The file centrality service indicates how important the source code file is relative to other source code files in a company's source code. The file centrality service thus identifies programming crown jewels.

BRIEF DESCRIPTION OF THE SEVERAL VIEWS OF THE DRAWINGS

The features, aspects, and advantages of source code similarity are understood when the following Detailed Description is read with reference to the accompanying drawings, wherein.

DETAILED DESCRIPTION

Figure 1:
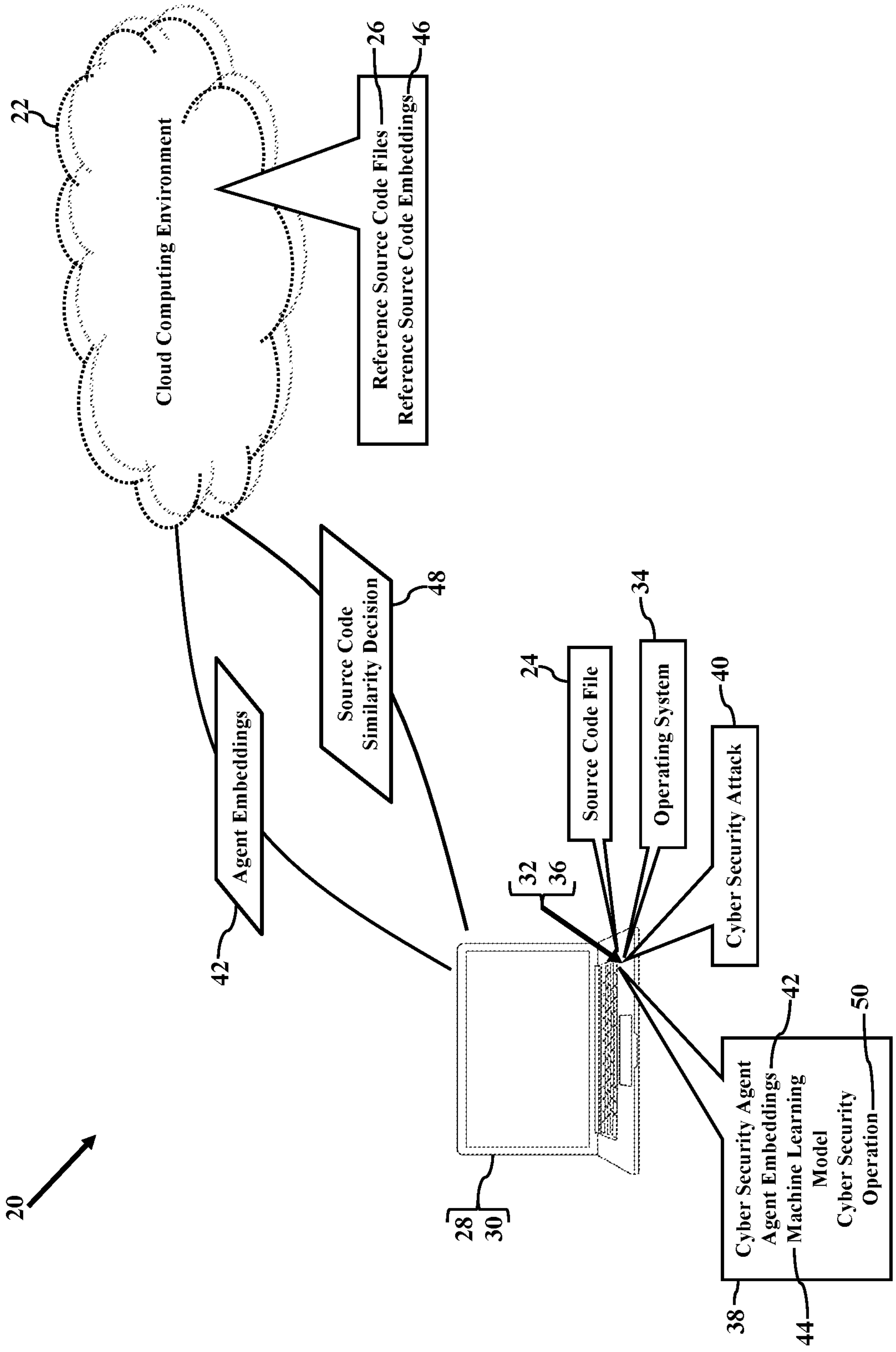
FIG. 1 illustrates simple examples of source code similarity.

Some examples relate to stopping misappropriation and exfiltration of computer source code files. A cyber security agent is a software application that is downloaded and installed to any computer system. The cyber security agent monitors the computer system for suspicious activities that may indicate theft or inadvertent disclosure of computer source code files. The source code files include source code, which is a very valuable component of any computer program. Some source code is commonly shared and publicly available on the Internet. Other source code, though, is the "secret sauce" of the computer program and may represent very valuable intellectual property. The cyber security agent monitors the computer system and stops any activities that may reveal computer source code meeting certain criteria. The cyber security agent, for example, stops a rogue employee from copying and stealing the source code file. The cyber security agent also blocks an email or text transmission of the source code file. The cyber security agent blocks any suspicious activities that could disclose the computer source code.

Some examples also discover programming crown jewels. The cyber security agent may initiate or arrange a scan of the source code files stored by the computer system. As the cyber security agent scans the source code file, the cyber security agent may obtain version control information. The version control information logs every user who accessed the source code file. The version control information also logs changes made to the source code file. The cyber security agent may analyze the version control information, or the cyber security agent may upload the version control information for cloud analysis. Regardless, the version control information reveals which users put a lot of effort or work into the source code file. The version control information also reveals any rogue user that had no or little work history with the source code file, thus potentially indicating suspicious access activity. The version control information also reveals which source code files required much effort and which source code files were quickly created. The version control information thus indicates which source code files required much development time and effort, perhaps indicating important crown jewels.

Source code similarity will now be described more fully hereinafter with reference to the accompanying drawings. Source code similarity, however, may be embodied in many different forms and should not be construed as limited to the examples set forth herein. These examples are provided so that this disclosure will be thorough and complete and fully convey source code similarity to those of ordinary skill in the art. Moreover, all the examples of source code similarity are intended to encompass both structural and functional equivalents thereof. Additionally, it is intended that such equivalents include both currently known equivalents as well as equivalents developed in the future (i.e., any elements developed that perform the same function, regardless of structure).

FIG. 1 illustrates simple examples of a source code similarity service 20. A cloud computing environment 22 provides the source code similarity service 20 and determines when a source code file 24 is similar to, or dissimilar to, a corpus of reference source code files 26. While the source code file 24 may have any networked location, in this example, the source code file 24 is locally stored by a client computer system 28. The client computer system 28 is illustrated as a laptop computer 30. The client computer system 22, though, may be any processor-controlled device, as later paragraphs will explain. The laptop computer 30 has a hardware processor 32 that executes an operating system 34 stored in a local memory device 36. The laptop computer 30 also stores and executes a cyber security agent 38. The cyber security agent 38 is a software program that monitors the laptop computer 30 for evidence of a cyber security attack 40. The cyber security agent 38, for example, cooperates with the operating system 34 to detect any attempt to copy, transfer, or otherwise exfiltrate the source code file 24.

The source code similarity service 20 protects the source code file 24. Should the laptop computer 30 attempt to read, write, copy, transfer, or otherwise act with the source code file 24, the cyber security agent 38 may initiate the source code similarity service 20. The cyber security agent 38 protects the source code file 24 by cooperating with the operating system 34 to suspend or halt any hardware/software operations associated with the source code file 24. The cyber security agent 38, however, may instruct the operating system 34 to access the source code file 24, thus allowing the cyber security agent 38 to read the source code file 24 and to generate agent embeddings 42. The cyber security agent 38 generates the agent embeddings 42, for example, using a machine learning model 44 (as later paragraphs will explain in more detail). The machine learning model 44 was pre-trained by the cloud computing environment 22 using the corpus of the reference source code files 26. After the cyber security agent 38 generates the agent embeddings 42, the cyber security agent 38 may instruct the operating system 34 to upload the agent embeddings 42 to the cloud computing environment 22 for analysis. The cyber security agent 38 may also locally analyze the agent embeddings 42, as later paragraphs will explain.

The cloud computing environment 22 may analyze the agent embeddings 42. When the cloud computing environment 22 receives the agent embeddings 42, the cloud computing environment 22 determines whether the agent embeddings 42 are similar to, or dissimilar to, the corpus of reference source code files 26. The cloud computing environment 22, for example, may compare the agent embeddings 42, sent by the laptop computer 30, to reference source code embeddings 46 representing the corpus of the reference source code files 26. The cloud computing environment 22 may generate the reference source code embeddings 46 (as later paragraphs will explain).

The cloud computing environment 22 may generate a source code similarity decision 48. The source code similarity decision 48 is based on a comparison of the agent embeddings 42 to the reference source code embeddings 46. The source code similarity decision 48 represents how similar, or how dissimilar, the agent embeddings 42 are as compared to the reference source code embeddings 46. While the source code similarity decision 48 may be as detailed or as complex as desired, in this example, the source code similarity decision 48 is merely a simple answer (e.g., yes/no, positive/negative, or binary I/O). The source code similarity decision 48, in other words, may affirm, assert, or confirm that the source code file 24 (as represented by the agent embeddings 42) is sufficiently similar to the corpus of the reference source code files 26 (as represented by the reference source code embeddings 46). The source code similarity decision 48, however, may indicate that the source code file 24 (as represented by the agent embeddings 42) is not sufficiently similar (e.g., dissimilar) to the corpus of the reference source code files 26 (as represented by the reference source code embeddings 46). The cloud computing environment 22 may send the source code similarity decision 48 to the laptop computer 30.

The source code similarity decision 48 reflects the corpus of the reference source code files 26. The source code similarity decision 48 indicates how similar, or how dissimilar, the source code file 24 is when compared to the corpus of the reference source code files 26. As one example, suppose that the corpus of the reference source code files 26 represents publicly-available open source code. In simple words, the publicly-available open source code is freely available for the general public to use. The machine learning model 44 may thus be trained using snippets, segment, statements, sequences, and/or entire files having the publicly-available open source code. So, if the source code similarity decision 48 indicates that the source code file 24 is sufficiently similar to the publicly-available open source code, then the source code similarity service 20 may determine that the source code file 24 contains only the publicly-available open source code. The source code file 24, in other words, may solely, mostly, or entirely contain non-proprietary, open source code that is freely available for all to use. Conversely, as another example, if the source code similarity decision 48 indicates that the source code file 24 is sufficiently dissimilar to the corpus of the reference source code files 26, then the source code similarity service 20 may determine that the source code file 24 contains proprietary programming. That is, because the source code file 24 is unlike, or does not resemble, the publicly-available open source code, the source code similarity service 20 may determine that the source code file 24 requires precautionary/protectionary measures to prevent disclosure.

The laptop computer 30 may take responsive action. When the laptop computer 30 receives the source code similarity decision 48, the operating system 34 sends or passes the source code similarity decision 48 to the cyber security agent 38. The cyber security agent 38 may then act or operate according to the source code similarity decision 48. The cyber security agent 38 may implement many different actions or operations, depending on programming. In general, though, the cyber security agent 38 implements one or more cyber security operations 50 in response to the source code similarity decision 48.

Figure 2:
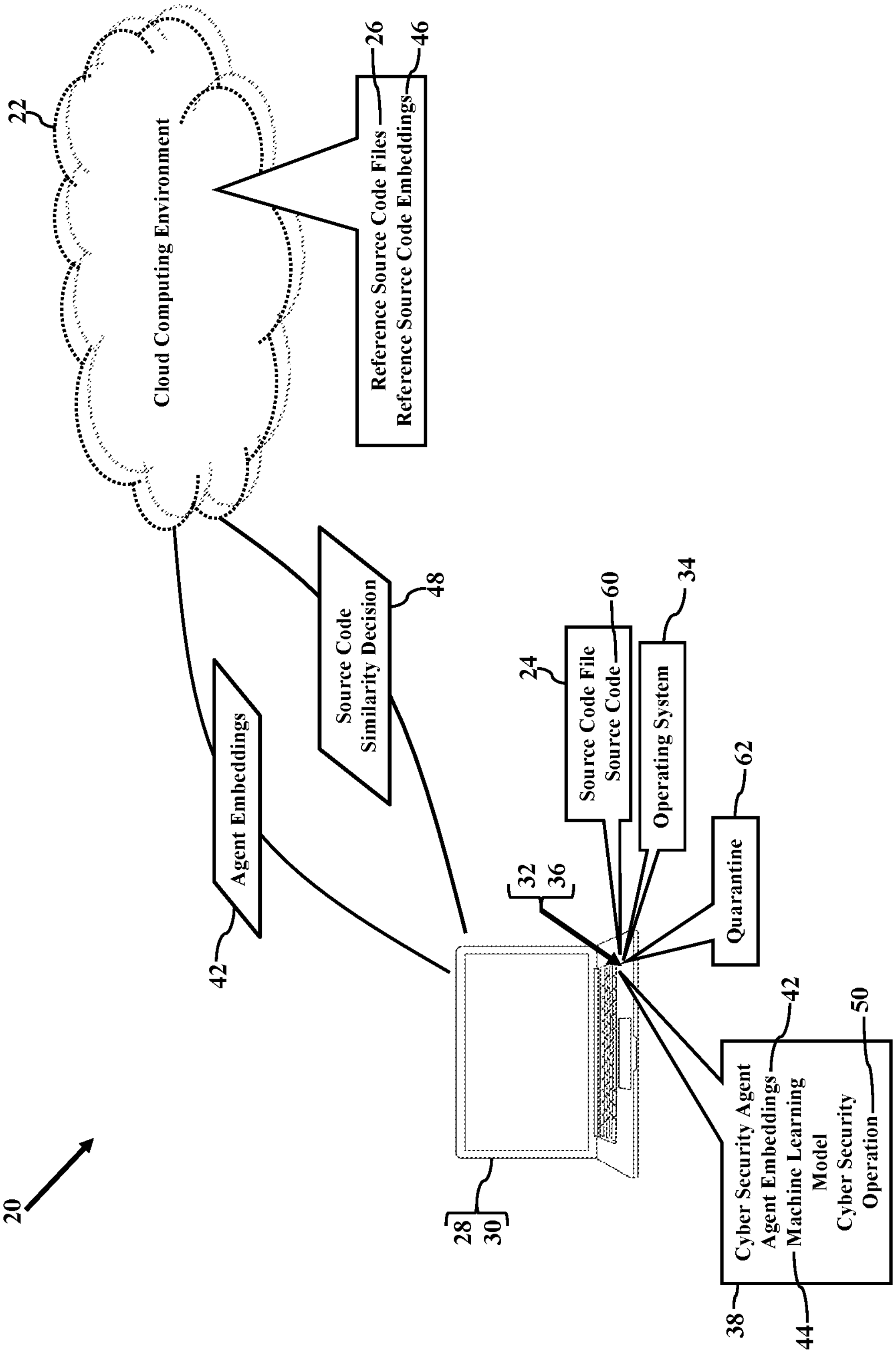
FIG. 2 illustrates examples of automated misappropriation prevention.

FIG. 2 illustrates examples of preventative measures. When the cyber security agent 38 receives the source code similarity decision 48, the cyber security agent 38 may prevent misappropriation of the source code file 24. For example, should the source code similarity decision 48 indicate that the source code file 24 is sufficiently dissimilar to the corpus of the reference source code files 26 (perhaps representing publicly-available open source code), then the source code similarity service 20 may determine that the source code file 24 contains proprietary programming. That is, because the source code file 24 is unlike, or does not resemble, the publicly-available open source code, the source code file 24 may require precautionary/protectionary measures to prevent disclosure. The source code file 24 may contain very valuable functional source code 60 and perhaps non-functional textual descriptions or comment statements. So, if the computer system 28 (again illustrated as the laptop computer 30) is attempting to alter, display, copy, send, or transfer the source code file 24, then its computer source code 60 may be revealed. The operating system 34 may thus notify the cyber security agent 38 of any hardware and software events involving the source code file 24. The cyber security agent 38 may thus implement the cyber security operations 50 as precautions against inadvertent or malicious disclosure of the source code file 24 and its source code 60. For example, the cyber security agent 38 may prevent or deny some or all hardware/software operations involving the source code file 24, thus effectively confining or quarantining 62 the source code file 24 to the local memory device 36. The cyber security agent 38 may be further programmed to require highly-privileged credentials (e.g., administrator or manager) before releasing the source code file 24 from the quarantine 62. The cyber security operations 50, in other words, may prevent or block file accessing/opening/reading/displaying the source code file 24 without subsequent and/or administrative authentication. The cyber security agent 38 may similarly restrict the operating system 34 from copying and transferring the source code file 24 to a network destination. The cyber security operations 50 may be configured to protect the source code file 24, containing the computer source code 60, from being exposed absent added or extraordinary permissions.

The source code similarity service 20 also thwarts theft. When the operating system 34 is requested to perform any hardware/software operation associated with the source code file 24, the cyber security agent 38 may prevent exfiltration of the computer source code 60. When the source code file 24 contains the computer source code 60 that sufficiently matches the corpus of the reference source code files 26, the cyber security agent 38 may be programmed to deny hardware operations. The cyber security agent 38 stops/blocks any hardware/software operations that could reveal the source code 60 associated with the source code file 24. So, if any user of the laptop computer 30 is attempting to copy the source code file 24 (such as to a USB drive), then the cyber security agent 38 prevents possible theft/exfiltration/misappropriation. If the user is attempting to email/text/send the source code file 24 (such as to a network location), then the cyber security agent 38 prevents blocks communication via any network interface. If any software application is requesting hardware/software operations, then the cyber security agent 38 may block operations suspected as the cyber security attack 40.

The cyber security agent 38 may also decline precautionary measures. When the laptop computer 30 receives the source code similarity decision 48, the source code similarity decision 48 may indicate that the source code 60 (associated with the source code file 24) is similar to the corpus of the reference source code files 26. Again, for example, the corpus of the reference source code files 26 may represent publicly-available open source code that is freely available for the general public to use. If the source code similarity decision 48 indicates that the source code file 24 is sufficiently similar to the publicly-available open source code, then the source code similarity service 20 may determine that the source code file 24 contains only the publicly-available open source code. The source code file 24, in other words, may solely, mostly, or entirely contain non-proprietary, open source code that is freely available for all to use. In this example, then, the agent embeddings 42 (representing the source code file 24) were sufficiently similar to the reference source code embeddings 46 (representing the reference source code files 26). Because the source code file 24 is like the reference source code files 26, the cyber security agent 38 may permit hardware/software operations associated with the source code file 24. The cyber security agent 38, for example, may instruct or advise the operating system 34 to release the source code file 24 from the local memory quarantine 62. The cyber security agent 38 may allow or authorize hardware/software operations, such as file access, file opening, file reading, displaying, copying, and transferring of the source code file 24. The cyber security agent 38 may allow wireless/wireline communications via a network interface.

Figure 3:
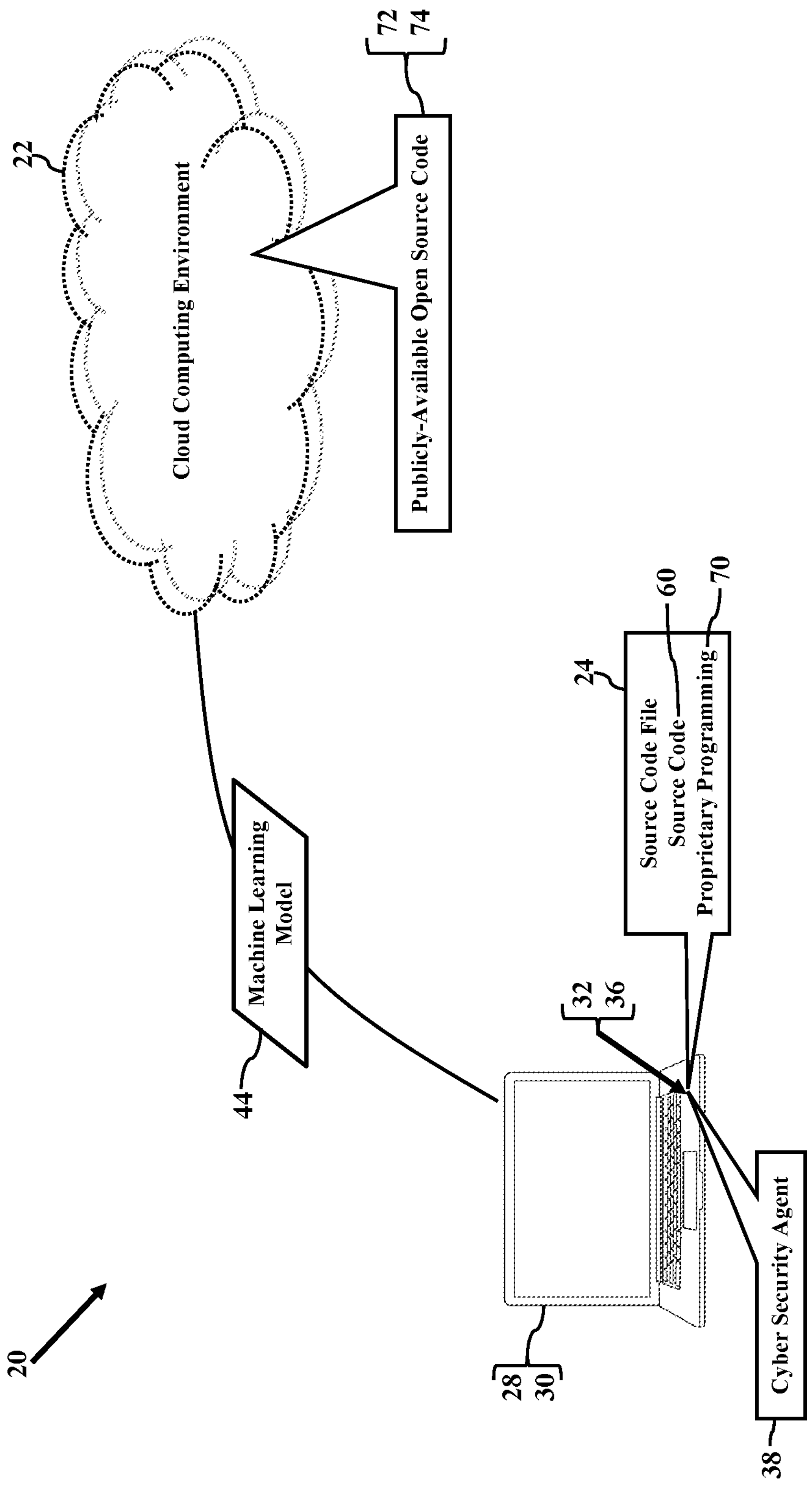
FIGS. 3-4 illustrate more examples of cyber security safeguards.
Figure 4:
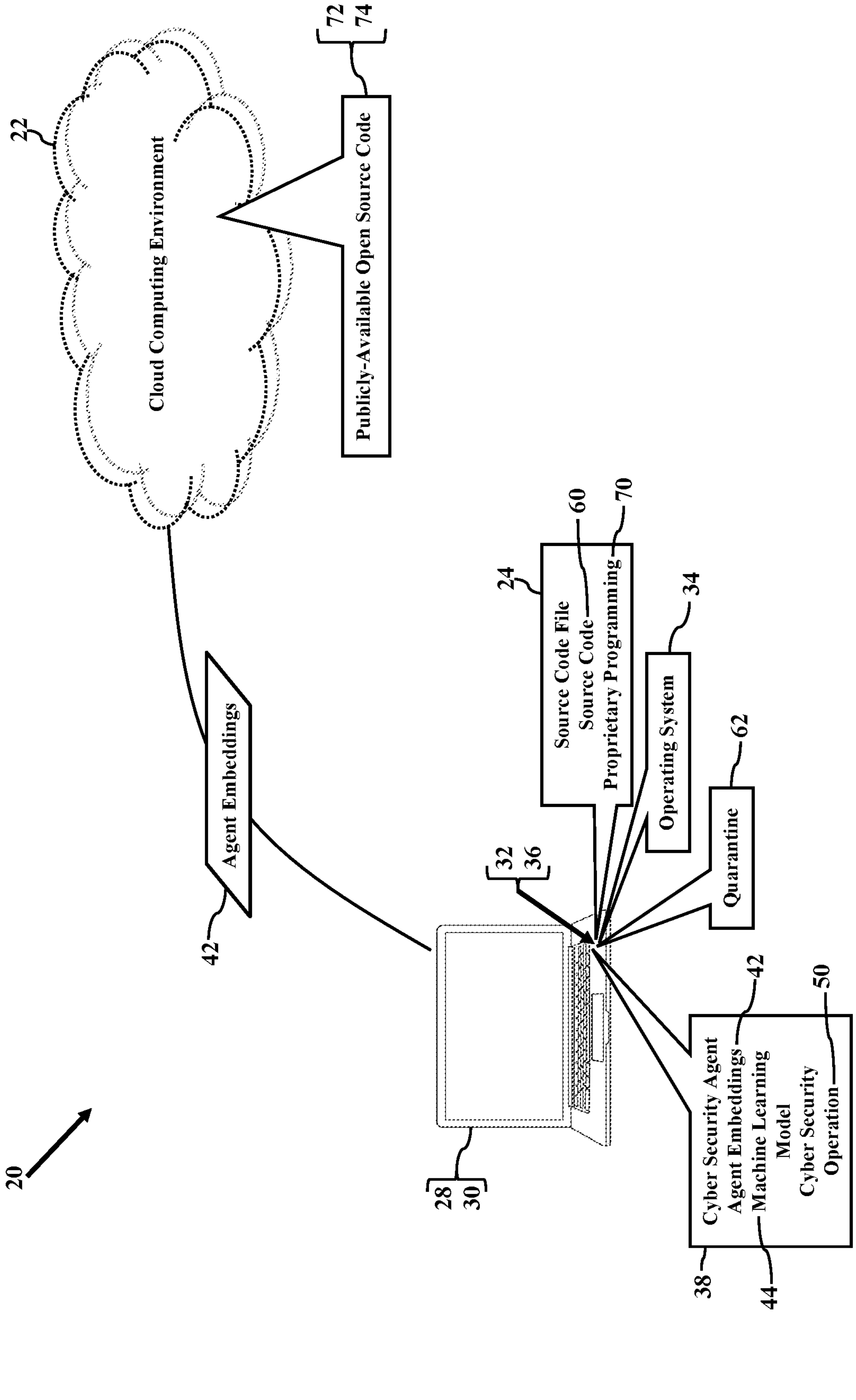

FIGS. 3-4 further illustrate more examples of cyber security safeguards. The source code similarity service 20 senses possible theft, misappropriation, unauthorized copying, or other exfiltration of the source code file 24. Because the source code file 24 may contain very valuable programming code and textual commentary, the source code similarity service 20 may prevent disclosure of proprietary programming 70. In this example, the machine learning model 44 is pre-trained by the cloud computing environment 22. The cloud computing environment 22 trains the machine learning model 44 using publicly-available open source code 72. In simple words, the publicly-available open source code 72 is freely available for the general public to use (within licensing terms that are not relevant here). The cloud computing environment 22 pre-trains the machine learning model 44 with training data 74 representing the publicly-available open source code 72. The training data 74 may thus be snippets, segment, statements, sequences, and/or entire files having the publicly-available open source code 72. The cloud computing environment 22 then distributes the pre-trained machine learning model 44 to the clients in the field (such as the cyber security agent 38 installed to the laptop computer 30).

As FIG. 4 illustrates, in some examples, the cyber security agent 38 applies the pre-trained machine learning model 44. When the laptop computer 30 receives the network- or cloud-trained machine learning model 44, the operating system 34 and the cyber security agent 38 cooperate to save the machine learning model 44 to the local memory device 36 of the computer system 28 (again illustrated as the laptop computer 30). When the operating system 34 notifies the cyber security agent 38 of any hardware or software operation associated with the source code file 24, the cyber security agent 38 may instruct the operating system 34 to halt/suspend the requested hardware/software operation and to confine the source code file 24 to the quarantine portion 62 of the memory device 36. The cyber security agent 38 may then apply the machine learning model 44 to the source code file 24 and generate the agent embeddings 42. In this example, then, the agent embeddings 42 represent the source code file 24, albeit perhaps in relation to the machine learning model 44 pre-trained using the publicly-available open source code 72. The cyber security agent 38 may instruct the operating system 34 to upload the agent embeddings 42 to the cloud computing environment 22 for analysis. In other examples, though, the machine learning model 44 may be implemented in the cloud computing environment 22, as later paragraphs will explain.

Figure 5:
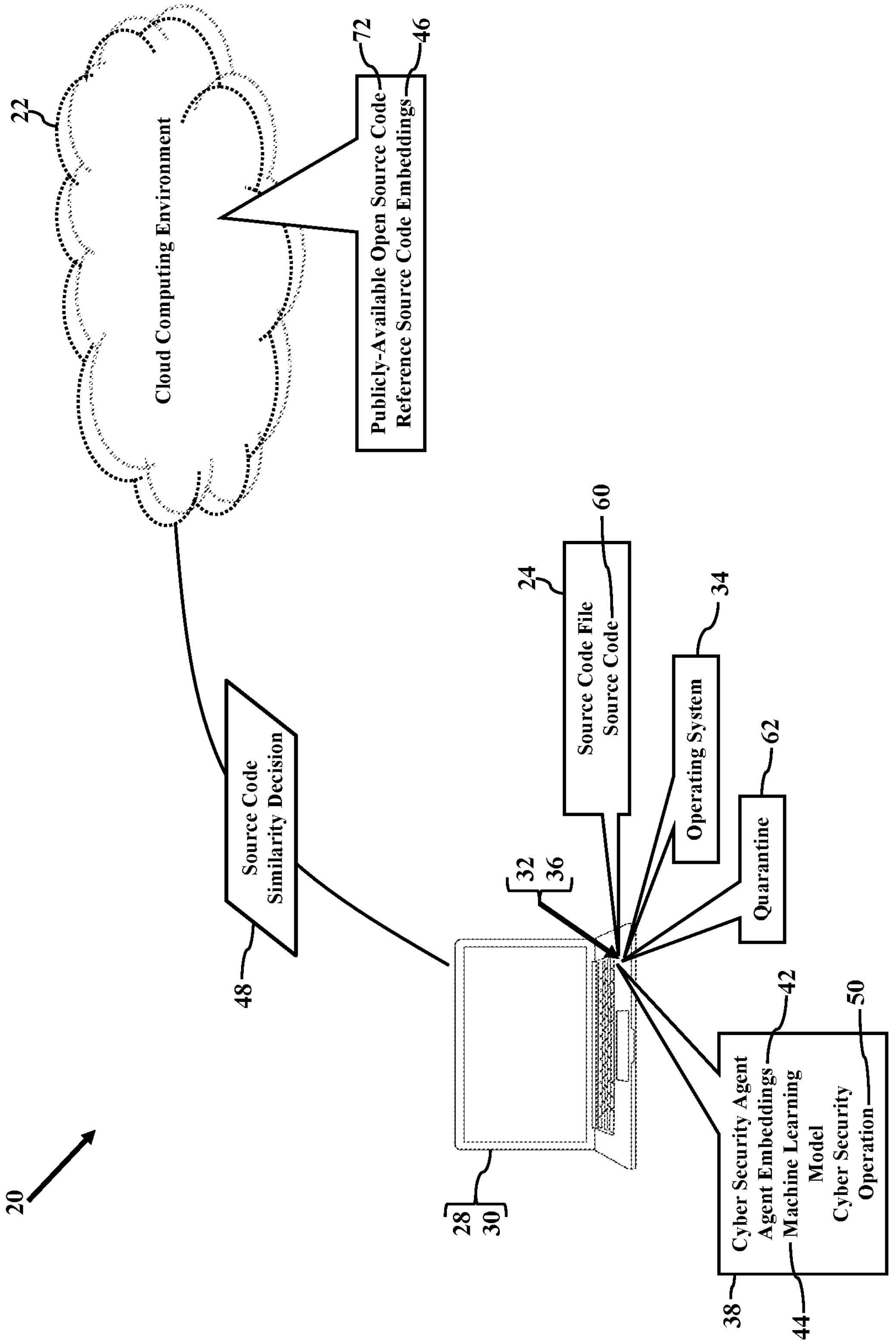
FIG. 5 illustrates examples of cloud analysis.

FIG. 5 illustrates examples of cloud analysis. When the cloud computing environment 22 receives the agent embeddings 42, the cloud computing environment 22 analyzes the agent embeddings 42. The cloud computing environment 22 determines whether the agent embeddings 42 (representing the source code file 24) are similar to, or dissimilar to, the reference source code embeddings 46. Here, though, the reference source code embeddings 46 represent the publicly-available open source code 72. The cloud computing environment 22 generates the source code similarity decision 48 and sends the source code similarity decision 48 back to the laptop computer 30. The cyber security agent 38 may then implement the cyber security operations 50 in response to the source code similarity decision 48.

Figure 6:
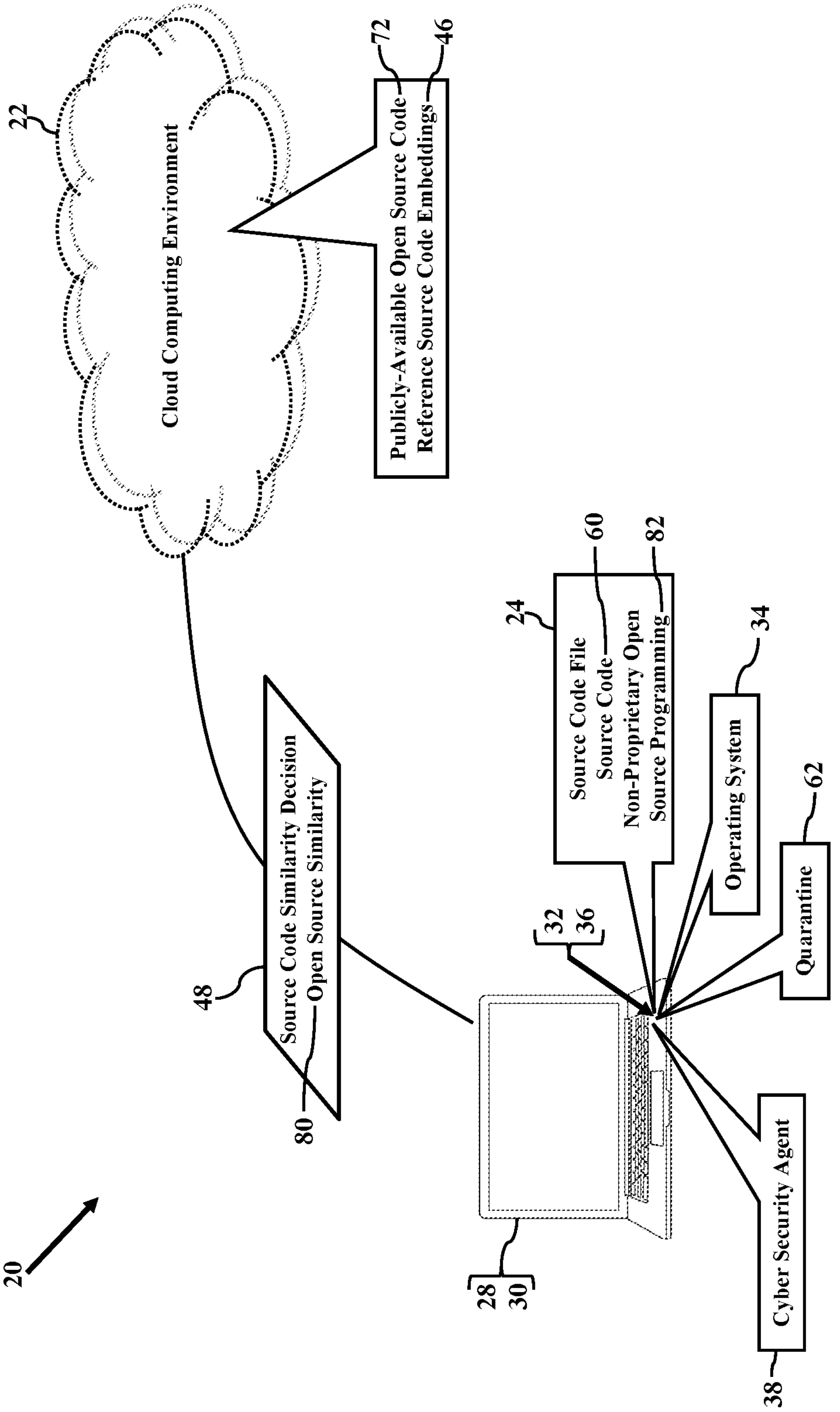
FIG. 6 illustrates examples of open source similarity.

FIG. 6 illustrates examples of an open source similarity 80. The source code similarity decision 48 may reflect or indicate a similarity to the publicly-available open source code 72. If the cloud-generated source code similarity decision 48 indicates that the source code file 24 is sufficiently similar to the publicly-available open source code 72, then the cyber security agent 38 may determine that the source code file 24 contains only the publicly-available open source code 72. The source code similarity decision 48 thus confirms the open source similarity 80 to the publicly-available open source code 72. The source code file 24, in other words, may solely or entirely contain non-proprietary, open source programming 82 that is freely available for all to use. Because the source code file 24 contains the non-proprietary, open source programming 82 (as indicated by the source code similarity decision 48), the cyber security agent 38 may permit hardware and software operations involving or associated with the source code file 24. The cyber security agent 38, for example, may release the source code file 24 from the memory quarantine 62, and the cyber security agent 38 may permit or authorize the operating system 34 to perform file access, file open, read, display, copy, transfer, and other operations.

Figure 7:
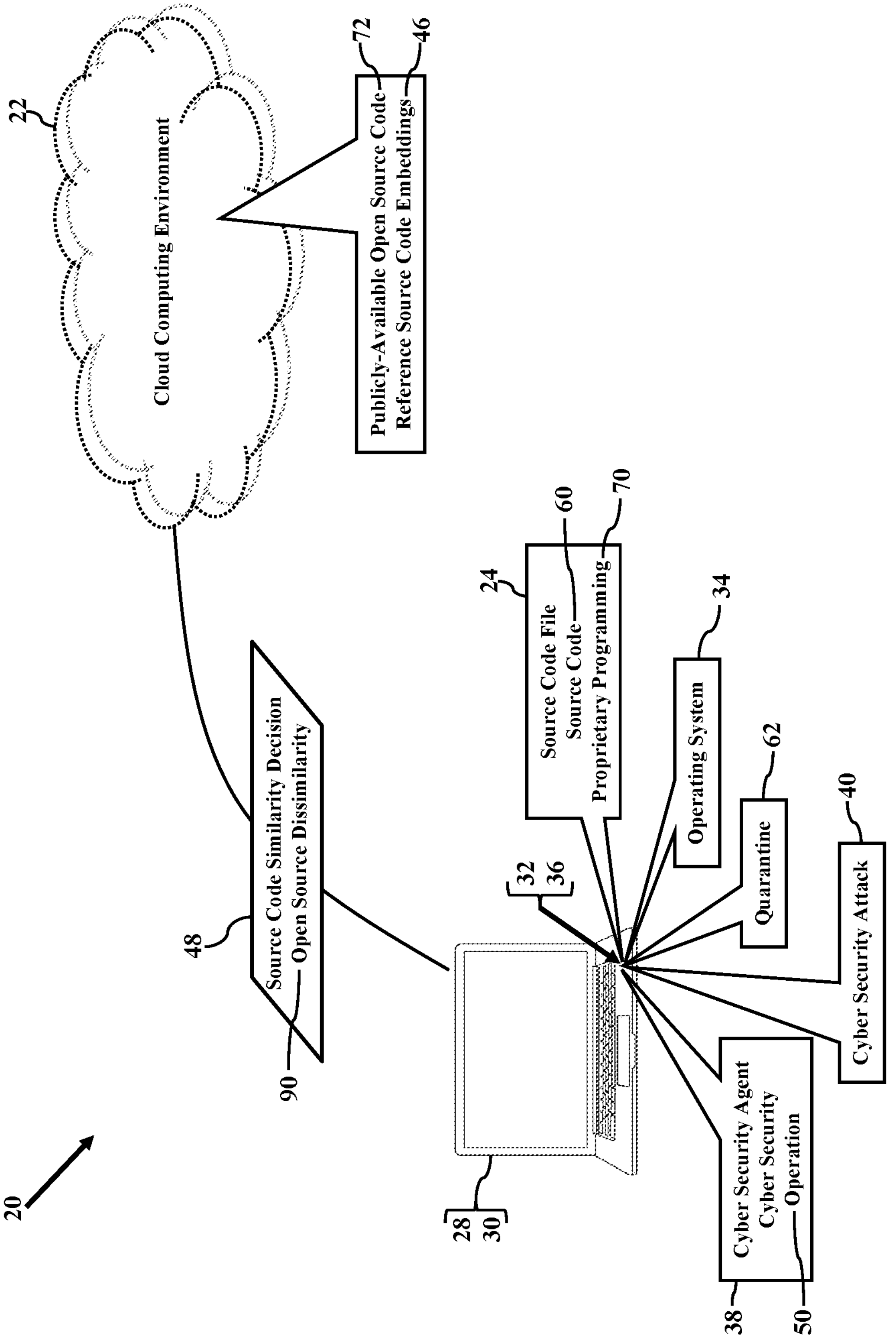
FIG. 7 illustrates examples of open source dissimilarity.

FIG. 7 illustrates examples of open source dissimilarity 90. If the cloud-generated source code similarity decision 48 indicates that the source code file 24 is sufficiently dissimilar to the publicly-available open source code 72, then the cyber security agent 38 may determine that the source code file 24 contains the proprietary programming 70. Because the source code 60, associated with the source code file 24, is unlike, or does not resemble, the publicly-available open source code 72, the cyber security agent 38 may determine that the source code file 24 contains the proprietary programming 70. When the source code similarity decision 48 indicates the open source dissimilarity 90, the cyber security agent 38 may implement precautionary/protectionary measures. For example, in response to the source code similarity decision 48 indicating the open source dissimilarity 90, the cyber security agent 38 may prevent disclosure/dissemination of the source code file 24. That is, because the proprietary programming 70 may be very valuable or important or even secret, the cyber security agent 38 may instruct the operating system 34 to maintain the quarantine 62 of the source code file 24. The cyber security agent 38 may instruct the operating system 34 to block, dismiss, or ignore operations involving or associated with the source code file 24 (such as file access, file open, read, display, copy, transfer, or any other). The cyber security agent 38 may further restrict the operating system 34 from copying and transferring the source code file 24 (such as via a network interface) to any network destination. The cyber security agent 38 may require highly-privileged credentials (e.g., administrator or manager) before releasing the source code file 24 from the quarantine 62. The cyber security agent 38 may order, command, or implement any cyber security operation 50 that prevents disclosure of the proprietary programming 70

The source code similarity service 20 thus greatly improves computer functioning. Exfiltration of programming crown jewels (such as the proprietary programming 70) is a major cyber security concern for threat teams of almost every company. The programming crown jewels required extensive hours to create and have a high intellectual property value. Any theft, misappropriation, or other exfiltration of the programming crown jewels exposes potential vulnerabilities in products and in services that could be exploited by malicious agents. The source code similarity service 20, instead, stops the cyber security attack 40 at the computer hardware level. Any hardware operations involving the source code file 24 may first be checked by the source code similarity service 20. If the source code file 24 contains the proprietary programming 70, then the source code similarity service 20 may block processor 32, memory 36, and/or operating system 34 operations, thus protecting the computer source code 60 and/or the proprietary programming 70. The source code similarity service 20 thus greatly improves computer functioning by detecting and by stopping the cyber security attack 40.

The source code similarity service 20 further improves computer functioning. Currently, insider threat teams have to manually analyze attempts to copy source files, for example onto a USB drive. This manual effort requires a lot of staff effort and is also error prone. Sometimes a list of the crown jewel source code file names (important source code file names) is used to reduce the effort involved. However, using a list of important source code files alone is not sufficient, as the list is dynamic and threat actors can easily obfuscate the code to conceal exfiltration attempts. The source code similarity service 20, instead, automatically identifies important source code files using machine learning. The source code similarity service 20 greatly reduces the effort required from the insider threat team analyst to prevent or detect code exfiltration attempts. The embedding similarity 20 further improves computer functioning.

Figure 8:
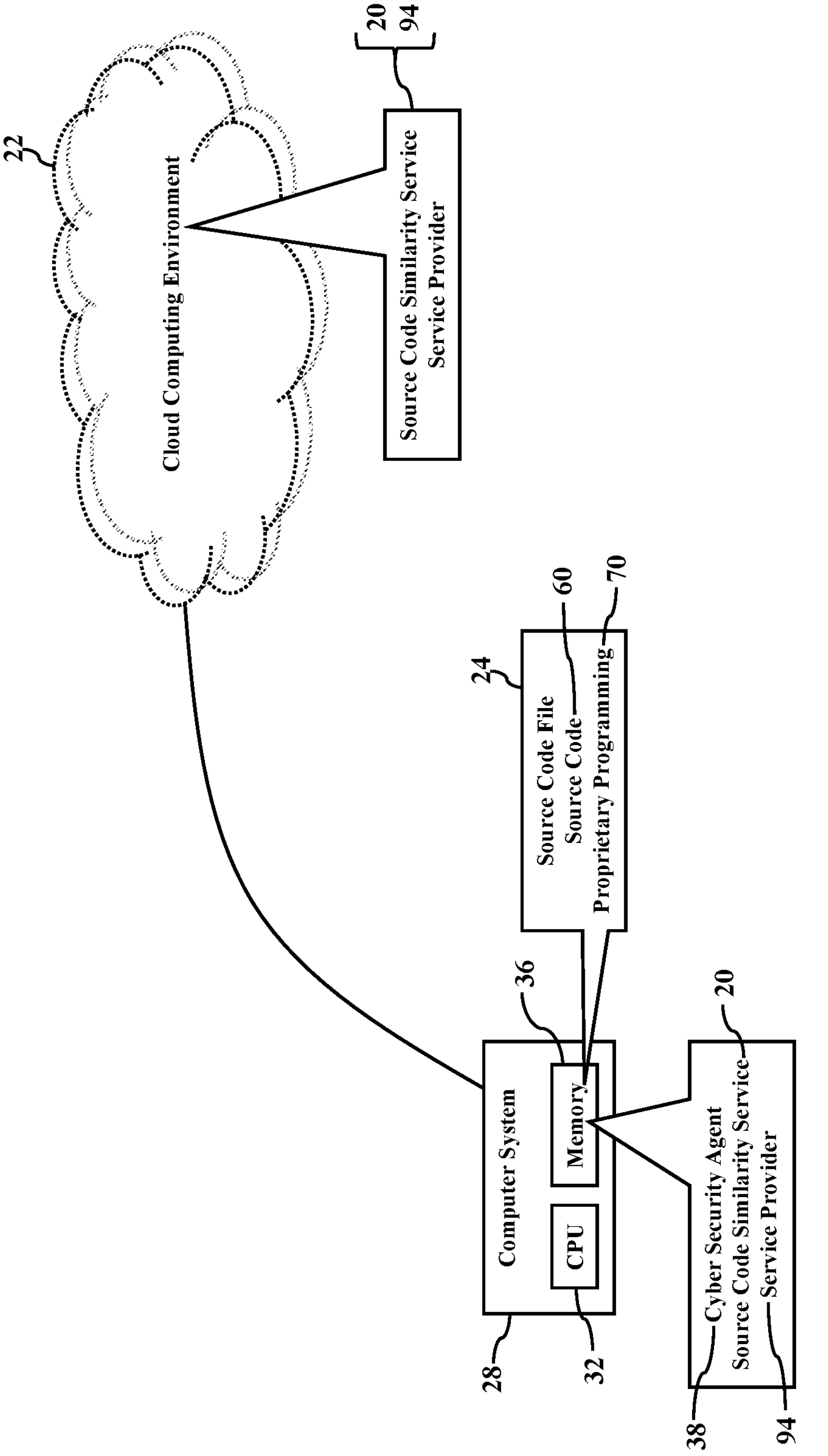
FIG. 8 illustrates examples of a source code similarity service.

FIG. 8 illustrates more examples of the source code similarity service 20. The cyber security agent 38, cooperating with the cloud computing environment 22, may provide the source code similarity service 20 as a cloud-based service to client machines (such as the computer system 28). The cyber security agent 38 and the cloud computing environment 22 may thus provide the source code similarity service 20 on behalf of a service provider 94. Clients or customers of the source code similarity service 20 download the cyber security agent 38 to their client computer machines (illustrated as the computer system 28). The cyber security agent 38 thus cooperates with the cloud computing environment 22 to provide the source code similarity service 20 and to detect misappropriation of the computer source code 60, the proprietary programming 70, and other crown jewels.

The source code similarity service 20 may thus be a component of an endpoint detection and response (or EDR) monitoring service. The cyber security agent 38 may be configured as a solely local access solution. The cyber security agent 38, in other words, may only have permissions or authorizations to read the source code file 24 stored by the local memory storage device 36. The cyber security agent 38, in other words, does not require access to a network database or central repository storing company secrets. In today's networking environment, programming code is often stored by one or more central servers (such as a GitHub repository). Companies are naturally reluctant to provide network access to the central server(s) storing the computer source code 60, the proprietary programming 70, and other crown jewels. The source code similarity service 20, however, may be configured and permitted as an endpoint monitor that only analyzes the source code file 24 locally stored by the computer system 28. Clients of the source code similarity service 20 merely download the cyber security agent 38 to their client computer machines (such as the laptop computer 30 illustrated in FIGS. 1-7). The cyber security agent 38 may only have permissions to monitor and to read computer file(s) that are locally stored by endpoint machines. The client's network/centrally-stored computer source code 60, the proprietary programming 70, and other crown jewels may remain inaccessible to the cyber security agent 38 and to the embedding similarity 20.

The agent embeddings 42 do not reveal client information. Even though the agent embeddings 42 represent the bit/byte content of the source code file 24, the agent embeddings 42 protect the computer source code 60. The agent embeddings 42 cannot be used to reconstruct the computer source code 60 contained within the source code file 24. So, even if a nefarious actor intercepted the agent embeddings 42, the nefarious actor would not have access or knowledge of the computer source code 60. So, even if the source code file 24 contains the proprietary programming 70, the agent embeddings 42 do not leak or reveal the proprietary programming 70. The client's crown jewels, in other words, remain safe and secure.

The source code similarity service 20 is thus very safe and very efficient. The cyber security agent 38 is a small, light-weight endpoint software sensor solution that may locally generate the agent embeddings 42. The cyber security agent 38 is highly computing effective, meaning that only minimal computation is needed (such as generating the agent embeddings 42). The cyber security agent 38 embeds the bit/byte content of the source code file 24 in a very safe way that does not expose any material information of the customer. Clients, customers, and other third parties feel very comfortable with an embedding representation of their data. Moreover, only the agent embeddings 42 are sent up to the cloud computing environment 22, thus again offering a safe and secure scheme that does not expose any material information. The cloud computing environment 22 may further pretrain the machine learning model 44, generate the reference source code embeddings 46, and perform the embedding similarity. These cloud-based operations/computations relieve the cyber security agent 38 from heavy processor/memory operations, thus keeping the cyber security agent 38 as a nimble cyber security solution. Simply put, the source code similarity service 20 is very acceptable to third parties.

The source code similarity service 20 requires little client resources. The cloud computing environment 22 may pretrain the machine learning model 44 to create the agent embeddings 42. No client hardware/software resources are required to process the massive training data 74 and to train the machine learning model 44. No client network resources are clogged/burdened with packet traffic to convey the training data 74. The cloud computing environment 22 handles the machine learning, generates the reference source code embeddings 46, and performs the embedding similarity. The cyber security agent 38 merely applies the trained machine learning model 44 to the client/customer input data (e.g., such as the source code file 24) during an inference time. The cyber security agent 38 then produces an output (e.g., the agent embeddings 42), which is very time and hardware-resource efficient. The burdensome machine learning training (such as ingesting hundreds of thousands or millions of files and tuning) occurs in the cloud computing environment 22, which means the cyber security agent 38 is very efficient. The source code similarity service 20 is thus a great trade off in which the cloud computing environment 22 configures the specifics of the machine learning algorithm and approach, but those specifics are then shipped to the cyber security agents 38 in the field. The cyber security agent 38 merely takes the client/customer input data (e.g., such as the source code file 24) and produces the output (e.g., the agent embeddings 42), which is very efficient.

The source code similarity service 20 does not require customer code. Because the cloud computing environment 22 handles training of the machine learning model 44, the cloud computing environment 22 also collects the publicly-available open source code 72. The cloud computing environment 22 surveys or crawls hundreds of thousands, or even millions, of open source files. The cloud computing environment 22 thus generates the training data 74 without requiring access to any customer/client/third-party code. A single version of the machine learning model 44, in other words, may be adequate for use by all third parties.

Figure 9:
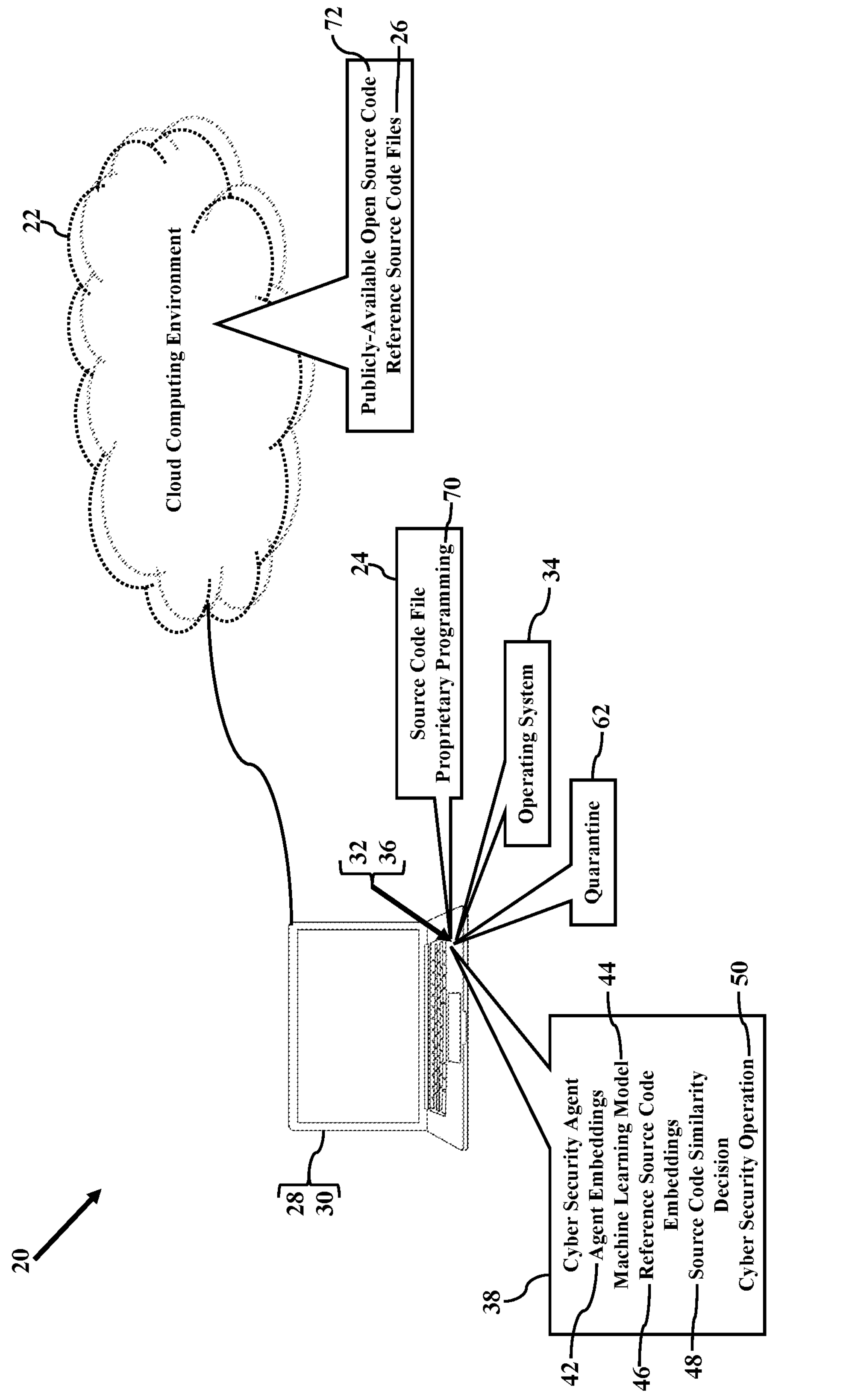
FIG. 9 illustrates examples of local analysis.

FIG. 9 illustrates examples of local analysis. Once the cyber security agent 38 generates the agent embeddings 42 (perhaps using the machine learning model 44), the cyber security agent 38 may be optionally configured to locally compare the agent embeddings 42. That is, the cyber security agent 38 may compare the agent embeddings 42 to the reference source code embeddings 46 representing the corpus of the reference source code files 26. The cyber security agent 38 may calculate the reference source code embeddings 46, or the cloud computing environment 22 may calculate and distribute the reference source code embeddings 46 to clients in the field. However the cyber security agent 38 generates or receives the reference source code embeddings 46, the cyber security agent 38 may then generate the source code similarity decision 48 based on the comparison of the agent embeddings 42 to the reference source code embeddings 46. Again, the source code similarity decision 48 represents how similar, or how dissimilar, the agent embeddings 42 are as compared to the reference source code embeddings 46.

The cyber security agent 38 may then implement responsive operations. For example, if the source code similarity decision 48 indicates that the source code file 24 is sufficiently dissimilar to the corpus of the reference source code files 26 (perhaps representing the publicly-available open source code 72), then the cyber security agent 38 may determine that the source code file 24 contains the proprietary programming 70. Again, if the source code file 24 is unlike, or does not resemble, the publicly-available open source code 72, then the cyber security agent 38 may implement precautionary/protectionary measures to protect the source code file 24 from disclosure. The cyber security agent 38 may thus implement the cyber security operations 50, such as denying some or all hardware/software operations involving the source code file 24, thus effectively confining or quarantining 62 the source code file 24 to the local memory device 36. The cyber security agent 38 may be further programmed to require highly-privileged credentials (e.g., administrator or manager) before releasing the source code file 24 from the quarantine 62. The cyber security operations 50, in other words, may prevent or block file accessing/opening/reading/displaying the source code file 24 without subsequent and/or administrative authentication. The cyber security agent 38 may similarly restrict the operating system 34 from copying and transferring the source code file 24 to a network destination. The cyber security operations 50 may be configured to protect the source code file 24 from being exposed absent added or extraordinary permissions.

The cyber security agent 38 may also decline precautionary measures. For example, if the source code similarity decision 48 indicates that the source code file 24 is similar to publicly-available open source code 72, then the cyber security agent 38 may permit hardware/software operations associated with the source code file 24. The cyber security agent 38, for example, may instruct or advise the operating system 34 to release the source code file 24 from the local memory quarantine 62. The cyber security agent 38 may allow or authorize hardware/software operations, such as file access, file opening, file reading, displaying, copying, and transferring of the source code file 24. The cyber security agent 38 may allow wireless/wireline communications via a network interface.

Figure 10:
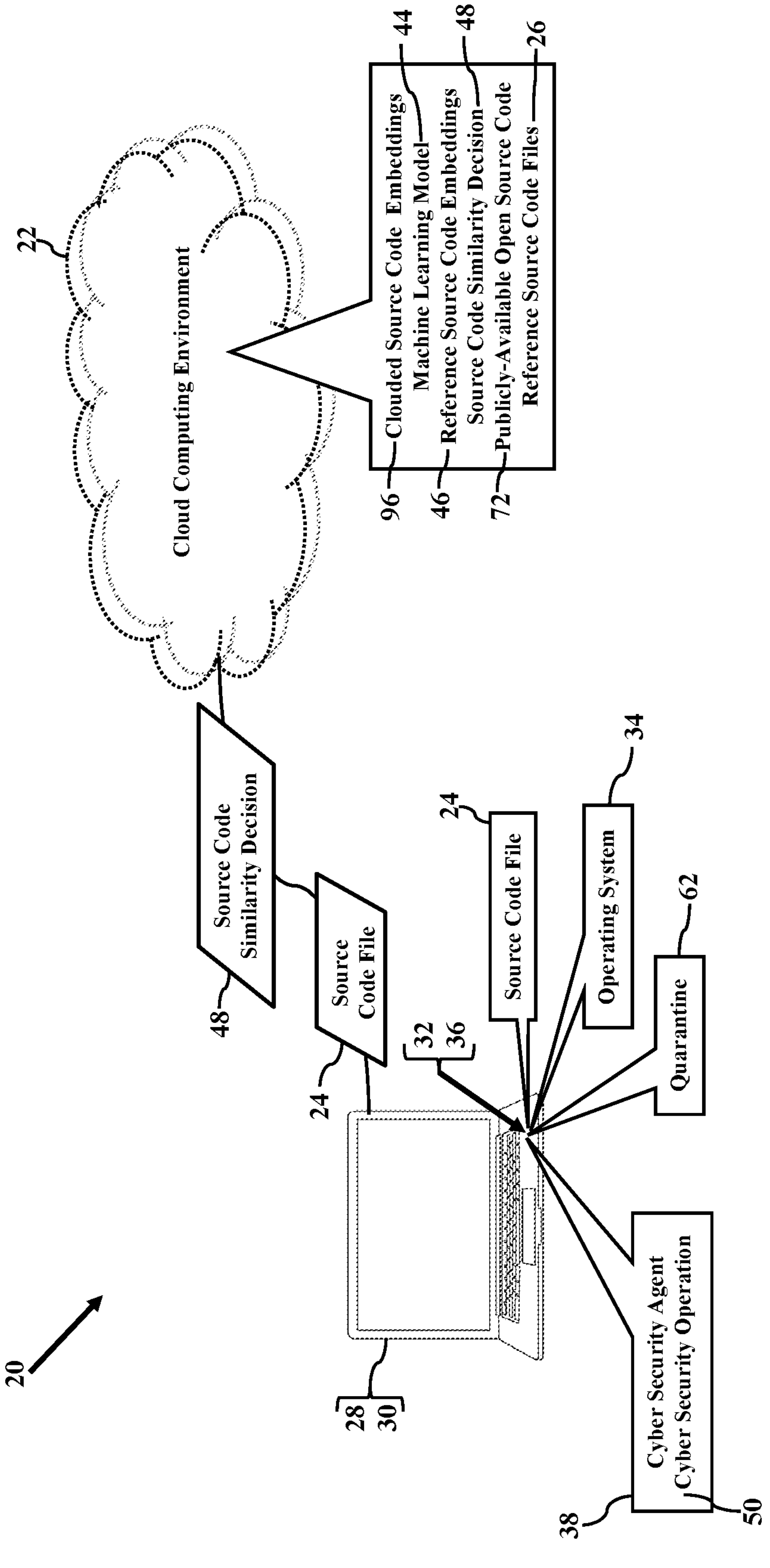
FIG. 10 illustrates examples of cloud modeling.

FIG. 10 illustrates examples of cloud modeling. Here the cyber security agent 38 may coordinate with the operating system 34 and upload the source code file 24 to the cloud computing environment 22 for expanded cloud analysis. When the cloud computing environment 22 receives the source code file 24, the cloud computing environment 22 may scan the source code file 24 and generate clouded source code embeddings 96 representing the source code file 24. Any cloud server, for example, may store and use the machine learning model 44 to generate the clouded source code embeddings 96 representing the source code file 24. The cloud computing environment 22 may further generate the reference source code embeddings 46 representing the corpus of the reference source code files 26. The cloud computing environment 22 may then generate the source code similarity decision 48 based on the comparison of the clouded source code embeddings 96 to the reference source code embeddings 46. Again, the source code similarity decision 48 represents how similar, or how dissimilar, the clouded source code embeddings 96 are as compared to the reference source code embeddings 46. The cloud computing environment 22 may then send the source code similarity decision 48 to the network/IP address associated with the laptop computer 30 and/or the cyber security agent 38. The cyber security agent 38 may then implement operations responsive to the source code similarity decision 48 (such as blocking or allowing the source code file 24, as this disclosure explains).

Figure 11:
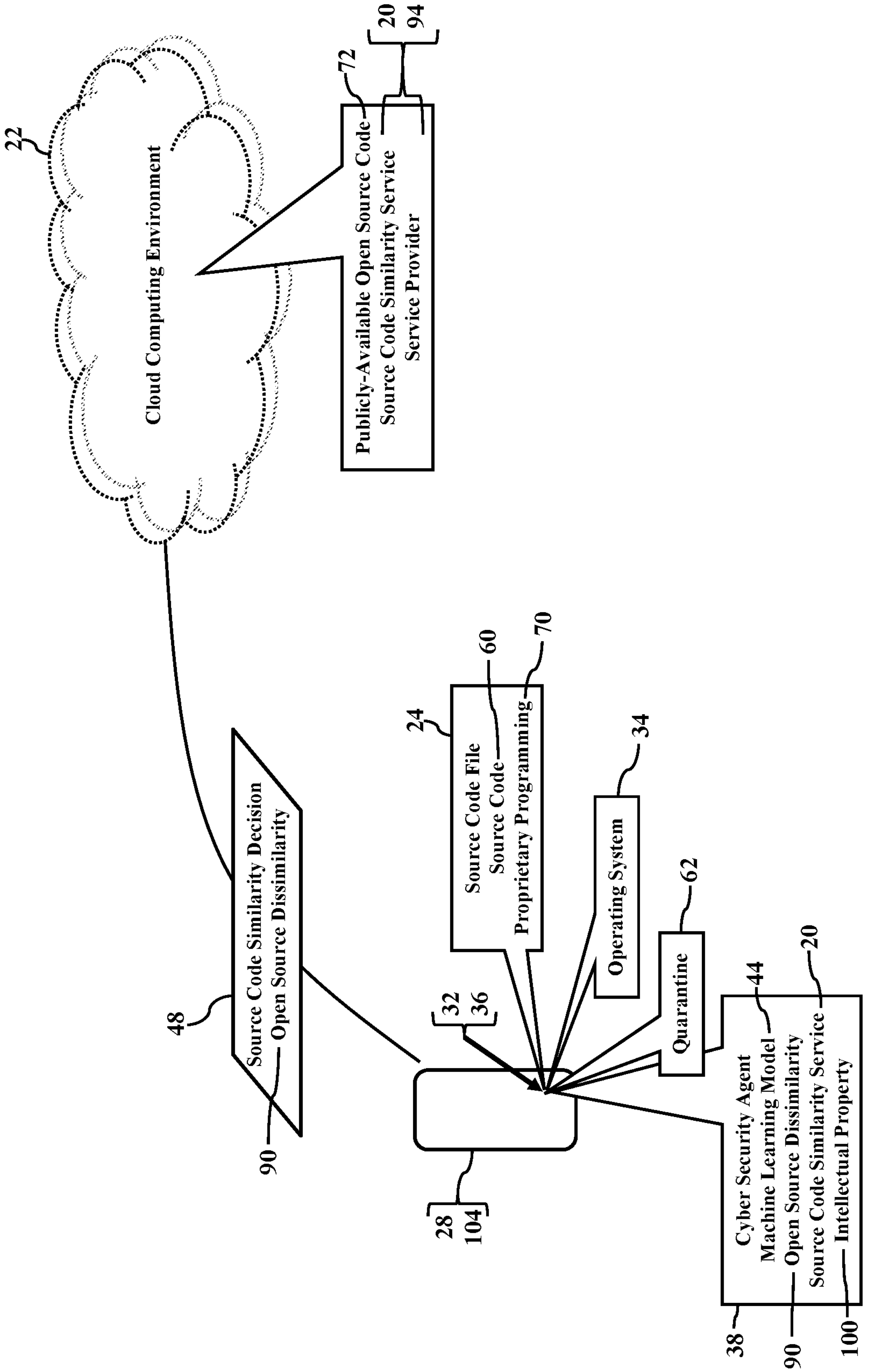
FIGS. 11-12 illustrate examples of identifying intellectual property.
Figure 12:
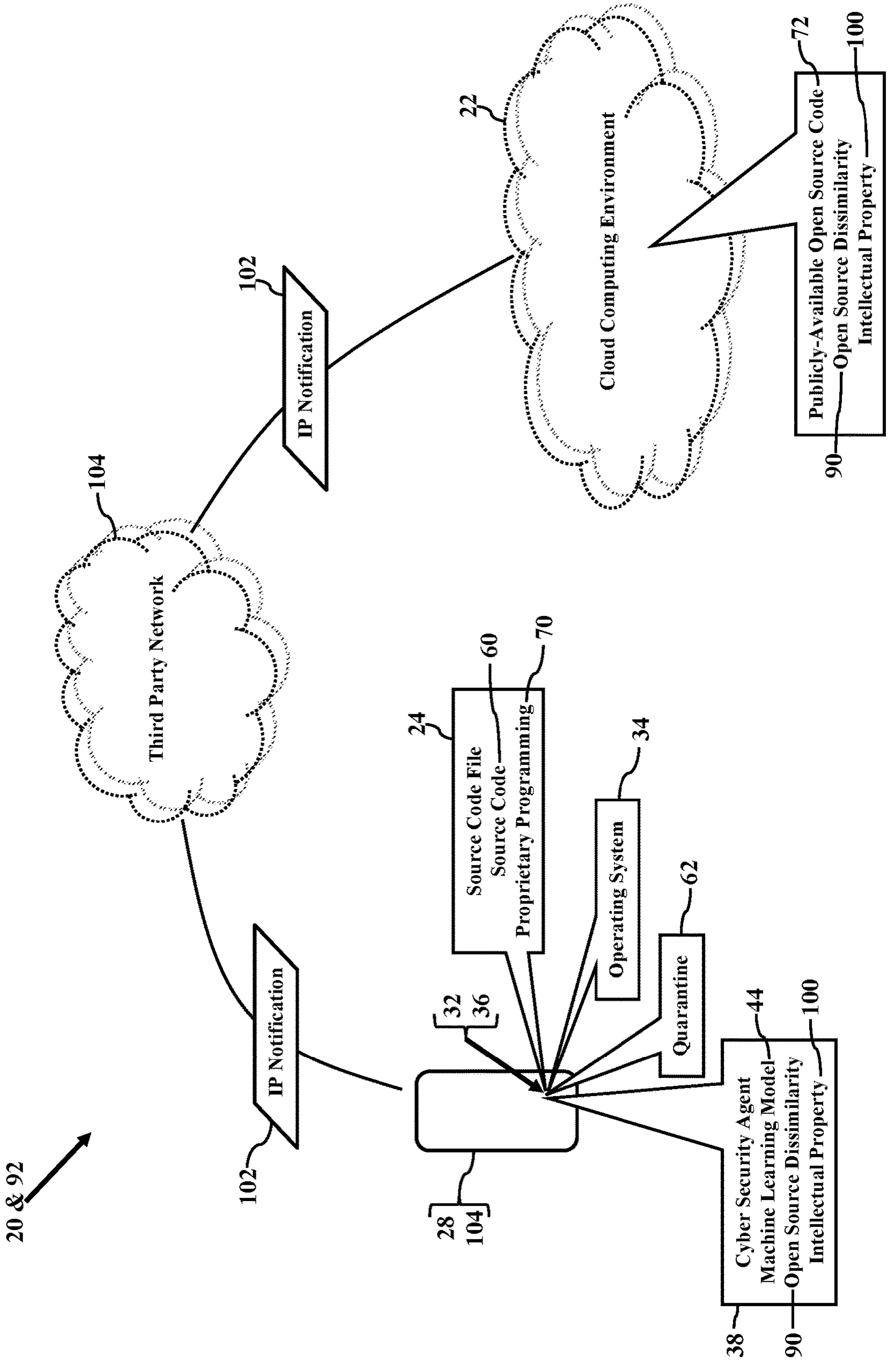

FIGS. 11-12 illustrate examples of identifying intellectual property 100. The source code similarity service 20 identifies any computer file (such as the source code file 24), stored by the computer system 28, that contains the computer source code 60. Again, while the computer system 28 may be any processor-controlled device, FIG. 11 illustrates the client computer system 28 as a mobile smartphone 104. Indeed, if the computer source code 60 is categorized by the cloud computing environment 22 as being the open source dissimilarity 90 to the publicly-available open source code 72, then the source code file 24 may contain the proprietary programming 70 (as this disclosure above explained). The source code similarity service cloud computing environment 22 may further categorize, classify, label, or flag the source code file 24 as the intellectual property 100. So, when the source code similarity service 20 determines that the source code file 24 contains the proprietary programming 70, the source code similarity service 20 may implement protective intellectual property operations. The source code similarity service 20, in other words, may automatically identify any proprietary programming 70 that potentially deserves intellectual property protection (e.g., patent, trademark, copyright, trade secret). The source code similarity service 20 thus identifies important source code assets (such as data security products). The source code similarity service 20 thus prevents misappropriation/exfiltration of important source code assets from customer networks. The source code similarity service 20 also minimizes the chances of releasing a code repository as open-source when, in actuality, the code repository is not open source and contains the proprietary programming 70. The source code similarity service 20 identifies the computer source code 60 that qualifies as the intellectual property 100.

The source code similarity service 20 spots programming assets. Many users, companies, and other third parties want to use and to share the publicly-available open source code 72. Most third parties, though, forbid revealing their proprietary programming 70 that required much time, money, and other resources to create. Unfortunately, though, sometimes the proprietary programming 70 is inadvertently released. The source code similarity service 20, instead, may first scan the source code file 24 prior to public release and identify the proprietary programming 70. The source code similarity service 20 may then flag the proprietary programming 70 and generate notifications. When the cyber security agent 38, for example, receives the source code similarity decision 48 (indicating the open source dissimilarity 90 to the publicly-available open source code 72), the cyber security agent 38 may instruct the operating system 34 to maintain the quarantine 62 of the source code file 24, thus preventing disclosure of the proprietary programming 70.

As FIG. 12 illustrates, customers may be alerted. When the source code similarity service 20 categorizes, classifies, labels, or flags the source code file 24 as the intellectual property 100, the source code similarity service 20 may generate notifications and implement intellectual property protective operations. The cloud computing environment 22, for example, may generate a source code intellectual property (or "IP") notification 102. The intellectual property notification 102 describes, explains, or includes the open source dissimilarity 90 to the publicly-available open source code 72. The intellectual property notification 102 may identify the source code file 24 (such as by a filename or other identifier). The intellectual property notification 102 may also identify the client computer system 28 (such as by make, model, serial number, and/or IP address). Again, while the computer system 28 may be any processor-controlled device, FIG. 10 illustrates the client computer system 28 as the mobile smartphone 104. The intellectual property notification 102 may also identify a user associated with the mobile smartphone 104 (such as a name, username, email address, or other identifier). The cloud computing environment 22 sends the intellectual property notification 102 to any network address or destination associated with the client, customer, or other third party. The source code similarity service 20, for example, may have a pre-defined or pre-configured notification address associated with the client, customer, or other third party network 104. Similarly, the cyber security agent 38 may generate the intellectual property (or "IP") notification 102 and send the intellectual property notification 102 to the customer's pre-established reporting/notification address. The source code similarity service 20 may thus alert clients, customers, and other third parties to the source code file 24 representing the intellectual property 100. The source code similarity service 20 alerts customers, clients, and other third parties of the proprietary programming 70 contained in the source code file 24. Third parties may thus implement other investigatory measures or procedures to protect the proprietary programming 70 as the intellectual property 100.

The source code similarity service 20 also targets protection efforts. Because the source code similarity service 20 identifies the proprietary programming 70, the source code similarity service 20 also focuses intellectual property services. The source code similarity service 20 automatically identifies the intellectual property 100 and may thus alert legal departments. Invention disclosure forms and processes may be at least partly automated, based on the proprietary programming 70 revealed by the source code similarity service 20. The source code similarity service 20 may thus proactively protect the intellectual property 100.

FIGS. 13-16 illustrate examples of centrality. When the source code similarity service 20 analyzes the agent embeddings 42, the source code similarity service 20 may implement an optional or additional file centrality service 110. The file centrality service 110, for example, may be implemented in response to identifying the proprietary programming 70 and/or the intellectual property 100. As one example, the source code similarity service 20 may execute the file centrality service 110 in response to deeming or determining that the source code file 24 is dissimilar from the reference source code files 26. As another example, the source code similarity service 20 may execute the file centrality service 110 in response to identifying the intellectual property 100. As still another example, the source code similarity service 20 may execute the file centrality service 110 as a cybersecurity service to identify suspicious/rogue access to the source code file 24.

Figure 13:
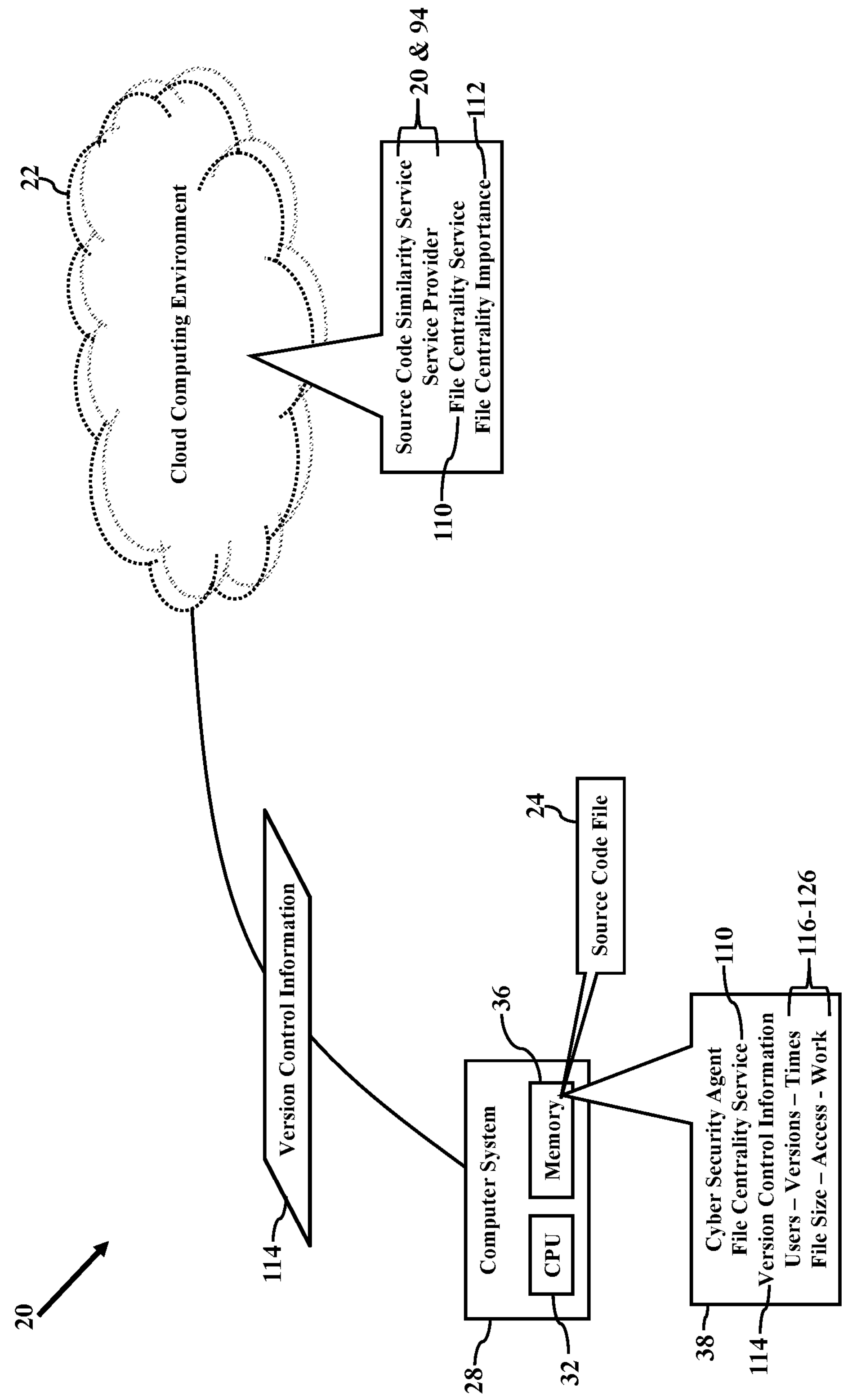
FIGS. 13-16 illustrate examples of file centrality.
Figure 14:
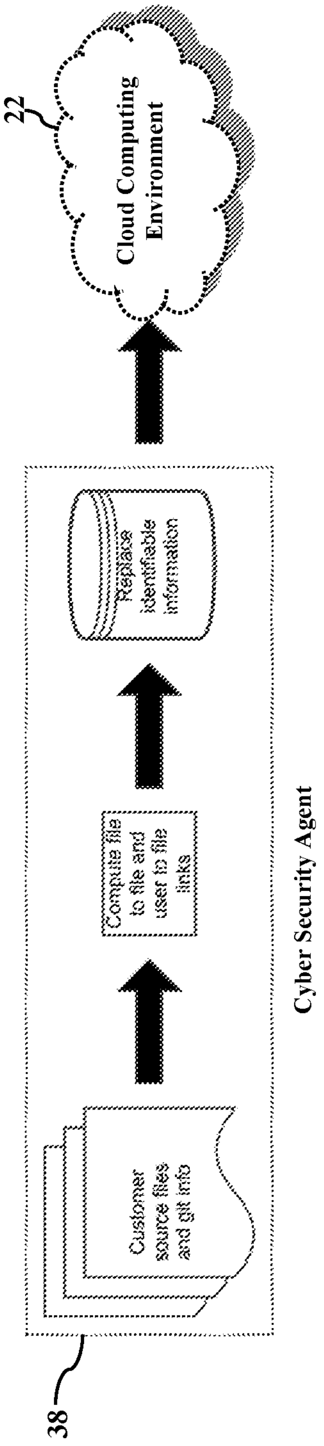

As FIGS. 13-14 illustrate, the file centrality service 110 adds service refinements that further identify a file centrality importance 112 associated with the source code file 24. The file centrality importance 112, in simple words, expresses or describes how important the source code file 24 is to the customer or client. When the operating system 34 notifies the cyber security agent 38 of any hardware/software operations associated with the source code file 24, the cyber security agent 38 may retrieve and read version control information 114 associated with the source code file 24. While any version control system or service may be used, GIT® and/or GITHUB® are examples of version control platforms. If the version control information 114 is locally stored by the computer system 28, then the cyber security agent 38 may query for and retrieve the version control information 114. If the version control information 114 is remotely stored by a different server or device (such as the www.github.com domain or service), then the cyber security agent 38 may additionally or alternatively query for and retrieve the version control information 114. However the version control information 114 is obtained, the version control information 114 reveals what users 116 accessed and/or modified different versions 118 of the source code file 24 (and perhaps different versions of the computer source code 60). The version control information 114 may also reveal a time 120 and/or a bit/byte file size 122 associated with each file access 124 and/or version 118, thus perhaps indicating an amount of work 126 performed on the source code file 24 by each different user. Some customers/clients/third parties may consider the version control information 114 to be sensitive (such as user names, email addresses, and IP addresses), so the cyber security agent 38 may anonymize the version control information 114 (such as by hashing the user names, email addresses, and IP addresses). The cyber security agent 38 may upload the version control information 114 to the cloud computing environment 22.

Figure 15:
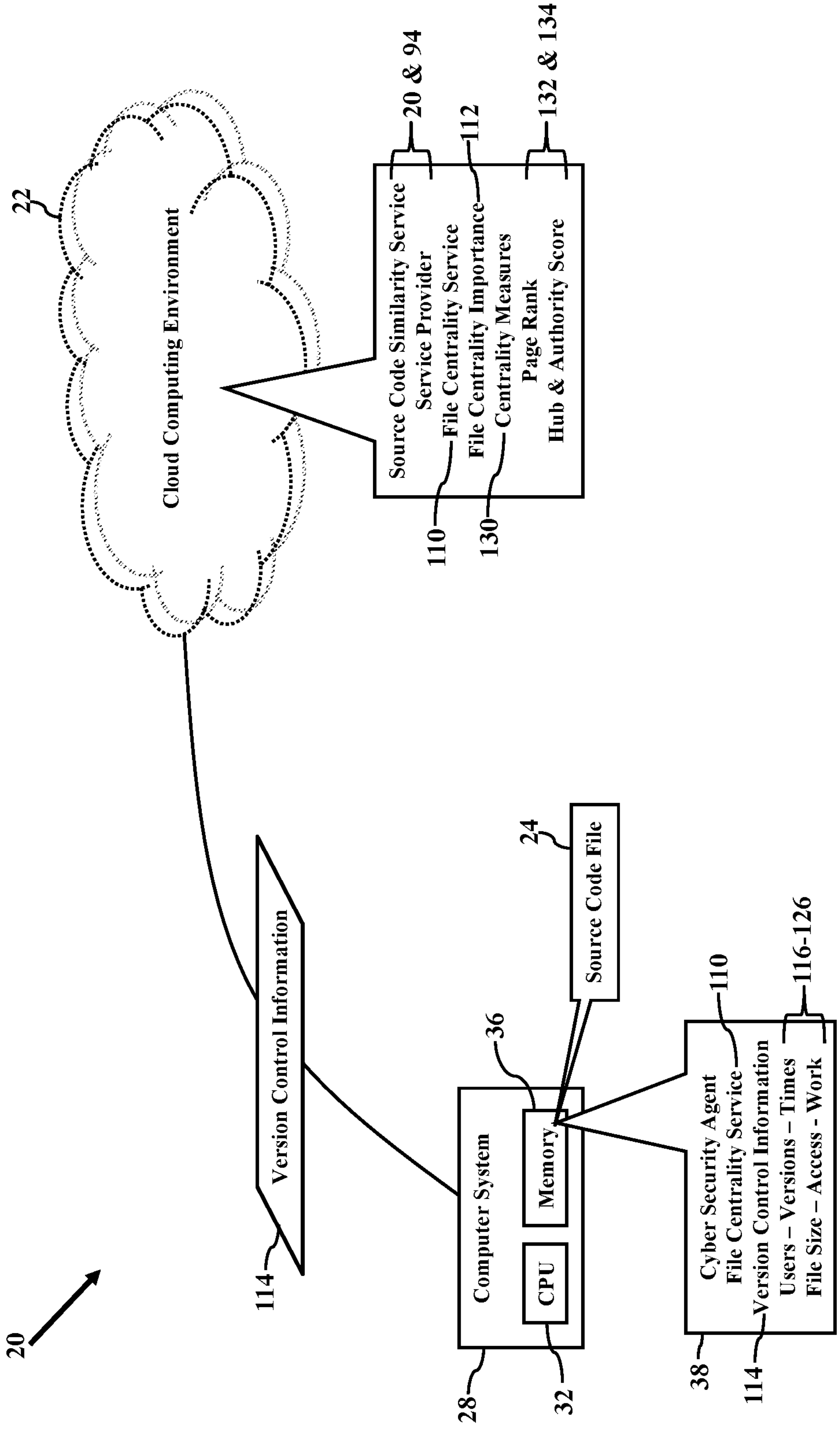
Figure 16:
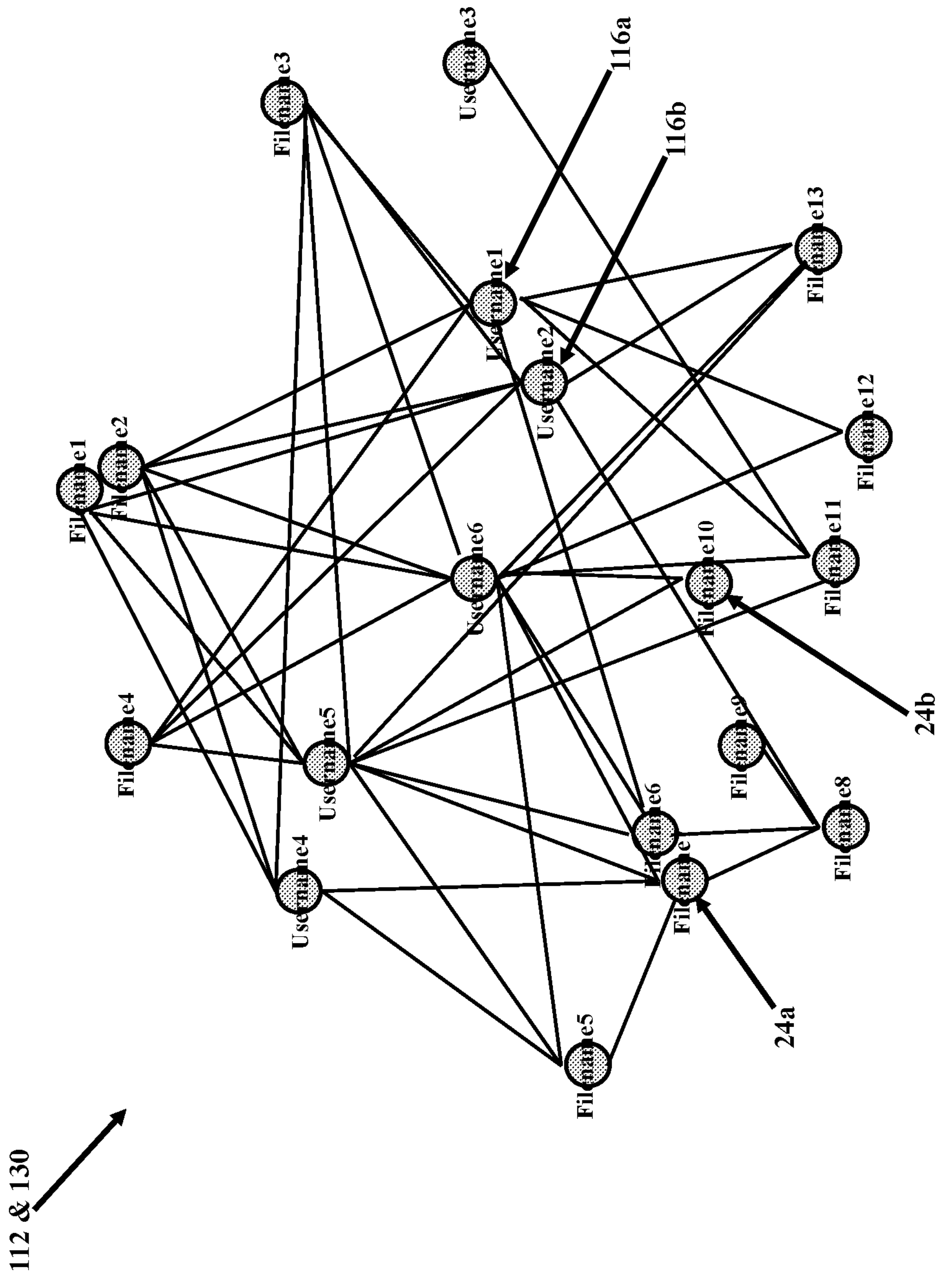

FIGS. 15-16 illustrate centrality measures 130. When the cloud computing environment 22 receives the version control information 114, the cloud computing environment 22 may generate one or more of the centrality measures 130. The centrality measures 130 further refine and determine the file centrality importance 112 associated with the source code file 24, perhaps based on a page rank 132 and a hub and authority score 134. While the file centrality importance 112 may have any representation or visualization, FIG. 16 illustrates the file centrality importance 112 as a graphical plot for case of interpretation. The centrality importance 112 reveals which users 116 worked on what files (such as the source code file 24). Those users 116 having higher work times 120 on the versions 118 typically make more important changes and contributions, thus perhaps contributing to the file centrality importance 112.

The centrality measures 130 may thus relate to source code importance. For example, consider the collection of source code files 24 as a network with the files 24 themselves representing nodes and any reference to another file representing an edge. Using information about Git commits and pull requests, users 116 who either authored or reviewed a file (such as the source code file 24) are also considered as nodes in the network with edges linking them to source code files 24 they worked on. FIG. 16 represents such a graph of some selected nodes and edges from a source code repository. Some nodes represent users 116 and other nodes represent the source files 24 in the repository. From this network, the following centrality measures 130 may be computed to get an indicator of which files are important:

Page rank;
Weighted page rank; and
Hubs and authority scores.

In the FIG. 16 source file graph, it can be seen that users such as "username1" (illustrated as reference numeral 116*a*) and "username2" (illustrated as reference numeral 116*b*) have worked on several files 24, especially those that are linked to by other files (e.g., filename7 24*a* and filename10 24*b*). These are the files 24 and users 116 that are relatively more central to the graph than others. These centrality measures 130 indicate changes to such files 24*a-b* typically have more centrality importance 112 than others. Similarly, work done by such users also have more impact typically. The file centrality service 110 may thus use the page rank 132 to identify such nodes by assigning them a high centrality score (e.g., the hub and authority score 134). The file centrality service 110 may generate the plot by selecting the subset of nodes with relatively high centrality (such as a filter comparison to a threshold centrality importance and/or to a threshold centrality measure). By using these centralities measures 130, the file centrality service 110 determines one or more indications of which source code files 24 are central to a customer. In addition to these centrality measures 130, information about the file size 122 and file content entropy may also be stored. Putting all of these together, the file centrality service 110 builds a centrality or a graph that connects files in users with weights on the edges, and then computes the centrality measures 130. The file centrality service 110 thus determines if the source code file 24 is central to a customer/client business. The file centrality service 110 also determines any repository that is also very central to where the source code file 24 resides.

Figure 17:
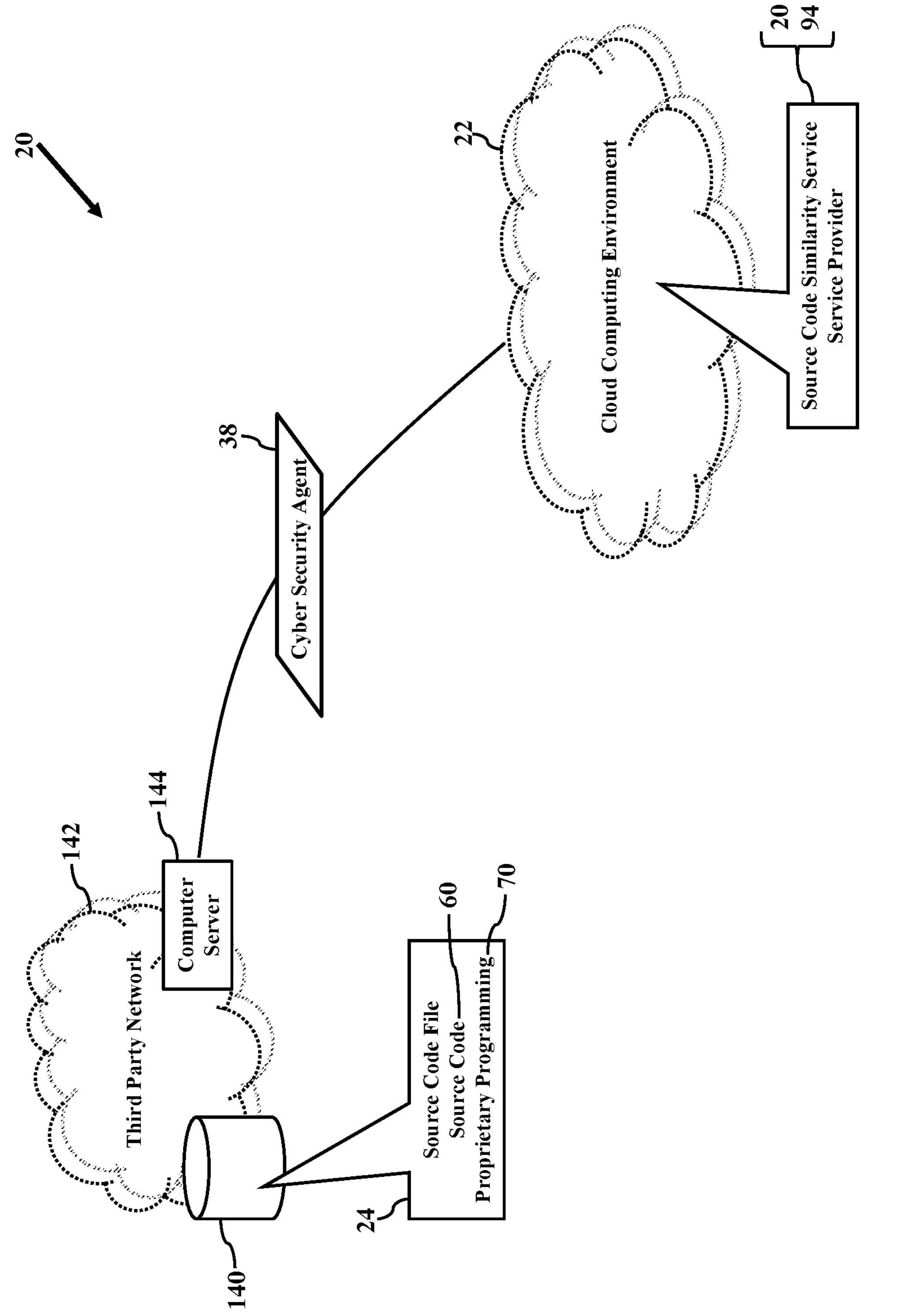
FIG. 17 illustrates examples of network monitoring.

FIG. 17 illustrates examples of network monitoring. The cyber security agent 38 may be downloaded and installed to any networked location. The cyber security agent 38 may have permissions to access any networked repository 140. The cyber security agent 38 may have credentials or authorizations to remotely access the client, customer, or other third party communications network 142. In FIG. 17, for example, a customer/client/third-party computer server 144 accesses the cloud computing environment 22 and downloads the cyber security agent 38. The customer/client/third-party computer server 144 installs the cyber security agent 38 and registers for the source code similarity service 20 provided by the cloud computing environment 22 on behalf of the service provider 94. The cyber security agent 38 may thus monitor the customer/client/third-party computer server 144 for any attempts to misappropriate the source code file 24. However, because the cyber security agent 38 may have permissions to access the customer/client/third-party communications network 142, the cyber security agent 38 may also monitor any networked repository 140 storing additional computer files. So, if the client so authorizes, the source code similarity service 20 may be provided to any network resource storing any client information.

Figure 18:
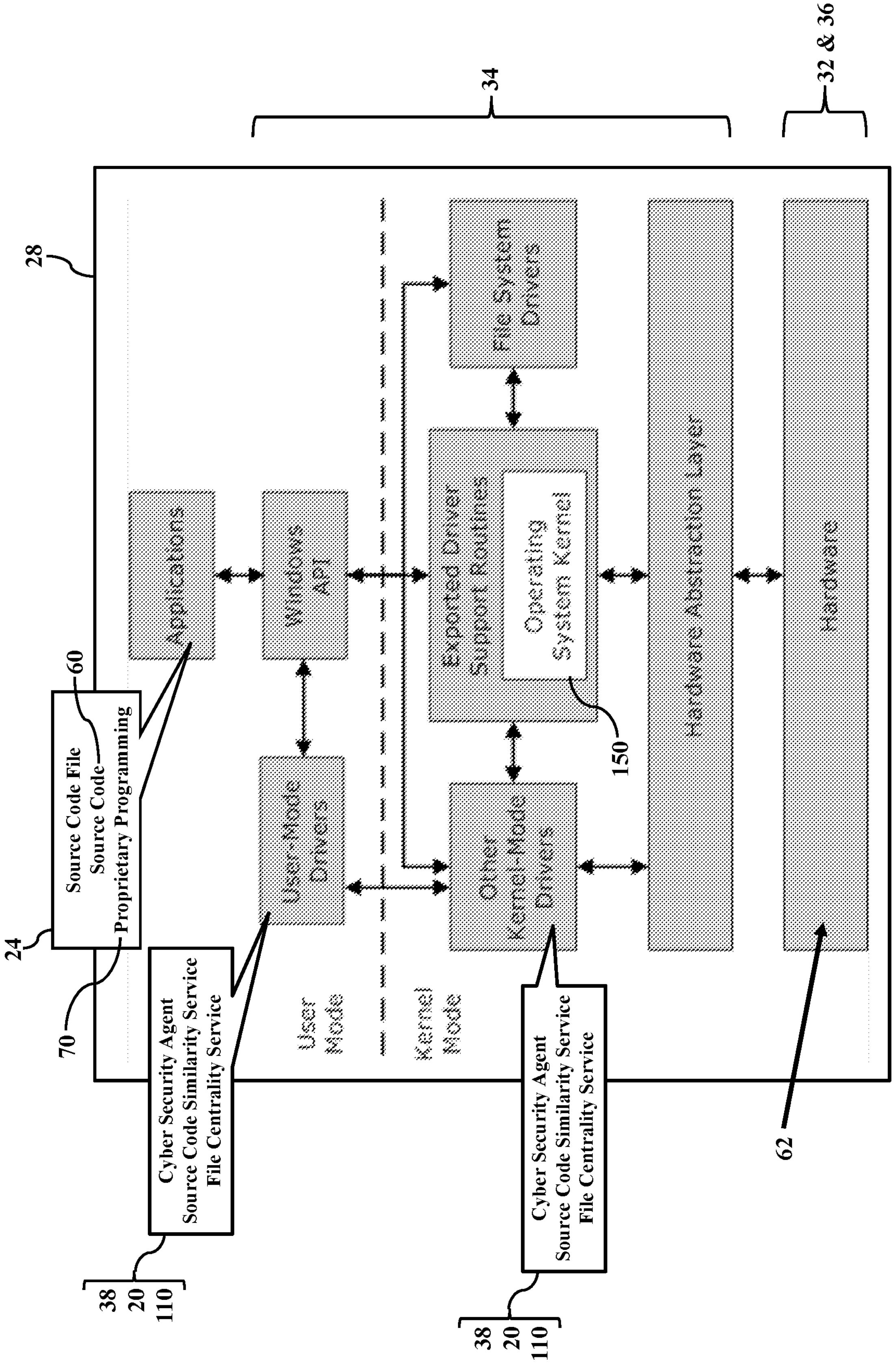
FIG. 18 illustrates more detailed examples of source code monitoring.

FIG. 18 illustrates more detailed examples of source code monitoring. The cyber security agent 38 interfaces with the operating system 34 to detect usage of the source code file 24. If the source code similarity service 20 determines that the source code file 24 contains the proprietary programming 70, then the cyber security agent 38 may block any usage that may disclose the source code file 24 and/or the proprietary programming 70. If the file centrality service 110 determines that the source code file 24 is central to a customer/client business, then the cyber security agent 38 may block any usage that may disclose the source code file 24, perhaps regardless of the proprietary programming 70.

The cyber security agent 38 may thus have permissions. The cyber security agent 38 contains software programming, code, or instructions that interface with the operating system 34. The cyber security agent 38 also contains software programming, code, or instructions that cause the operating system 34 to notify the cyber security agent 38 of any hardware/software operations involving the source code file 24. The cyber security agent 38, for example, may be an antimalware driver having kernel-level components having kernel-level permissions to a kernel 150 of the operating system 34. The cyber security agent 38 may additionally have user-mode components having user-level permissions to a user mode of the operating system 34. The cyber security agent 38 may include code or instructions that scan and monitor the computer system 28 for events, communications, processes, activities, behaviors, data values, usernames/logins, locations, contexts, and/or patterns that indicate evidence of any suspicious activities (such as any usage or operations of the source code file 24 perhaps indicating the cyber security attack 40, as previously explained). For example, when any software application requests that the operating system 34 perform any read/write/fetch/execute/decode/input/output or other operation involving or associated with the source code file 24, the operating system 34 may first notify the cyber security agent 38 via kernel-level notifications, user-mode notifications, and/or call backs. The operating system 34 may then suspend operations involving the source code file 24 and await further instructions from the cyber security agent 38.

Cloud services may be performed. When the operating system 34 alerts the cyber security agent 38 (perhaps via the kernel notification), the cyber security agent 38 may instruct the operating system 34 to suspend operations involving the source code file 24. The cyber security agent 38 may instruct the operating system 34 to move, transfer, or write the source code file 24 to the quarantine 62 within the memory device 36. The cyber security agent 38 cooperates with the operating system 34 to read the source code file 24 and to generate the agent embeddings 42 (as this disclosure previously explained). The cyber security agent 38 may also cooperate with the operating system 34 to identify and retrieve the version control information 114 (as this disclosure previously explained). The cyber security agent 38 uploads the agent embeddings 42 and/or the version control information 114 to the cloud computing environment 22 for analysis (as this disclosure previously explained). When the cyber security agent 38 receives the source code source code similarity decision 48, then the cyber security agent 38 determines the cyber security operations 50 (as this disclosure previously explained). The cyber security agent 38, for example, may instruct the operating system 34 to keep the source code file 24 confined within the quarantine 62 and/or to block any or all operations involving the source code file 24 (such as when the source code similarity service 20 classifies the source code file 24 as containing the proprietary programming 70 and/or when the file centrality service 110 classifies the source code file 24 as a core central business asset). The cyber security agent 38, however, may instruct the operating system 34 to release the source code file 24 from the quarantine 62 and/or to resume any or all operations involving the source code file 24 (such as when the source code file 24 only contains the publicly-available open source code 72 and/or when the centrality measures 130 indicate the source code file 24 is an unimportant asset).

Figure 19:
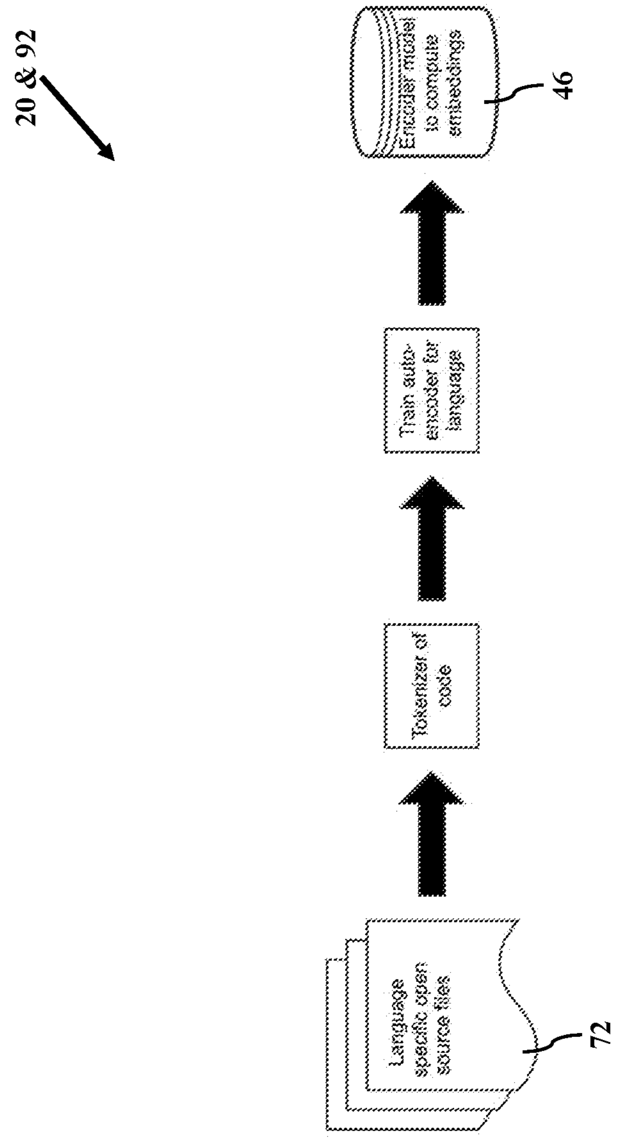
FIGS. 19-20 illustrate more detailed examples of service provisioning.
Figure 20:
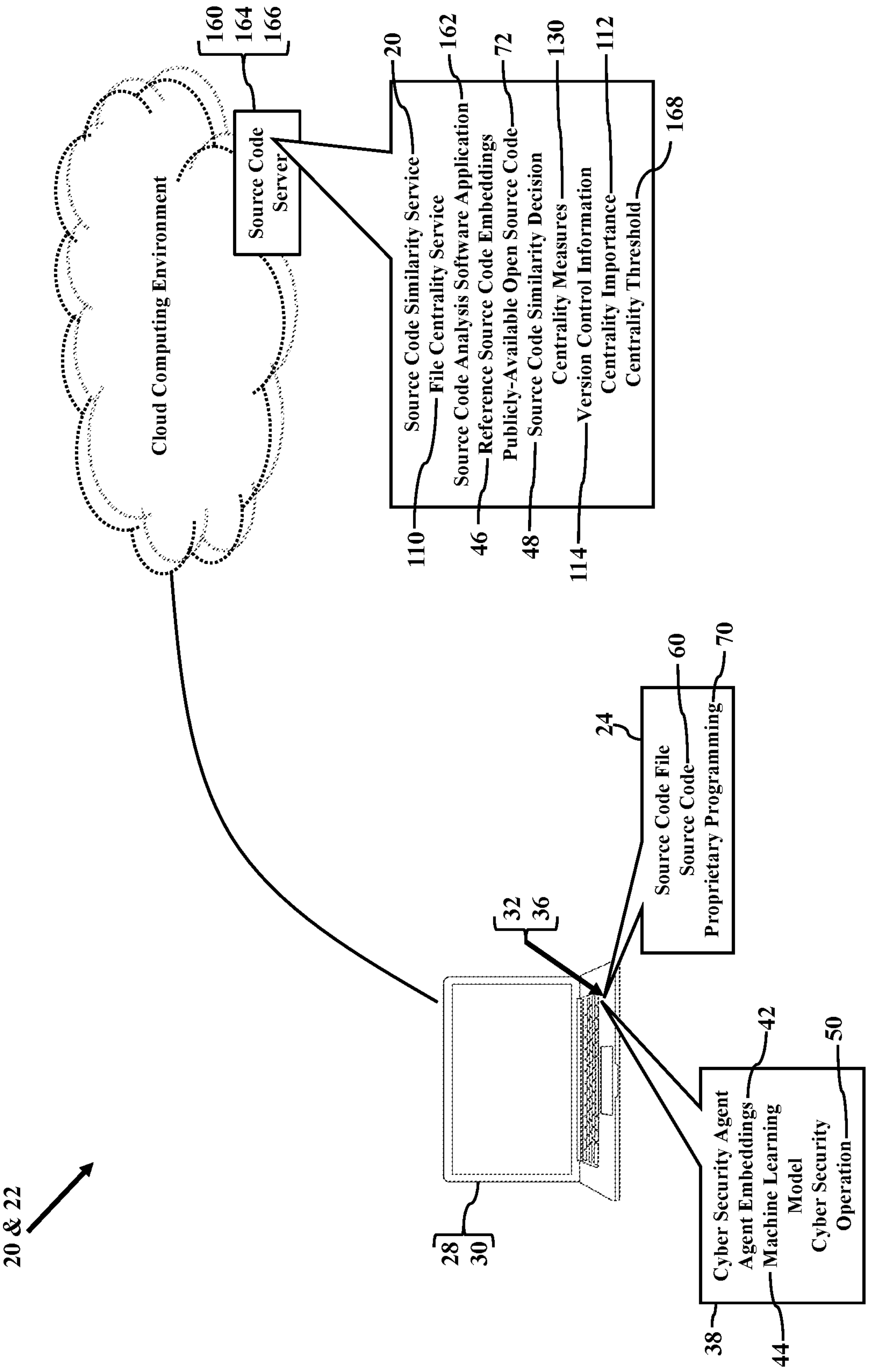

FIGS. 19-20 illustrate more detailed examples of service provisioning. The source code similarity service 20 identifies a company's important computer source code 60 (such as the proprietary programming 70) by finding the source code file 24 that is considerably different from the publicly-available open source code 72. As FIG. 19 illustrates, the reference source code embeddings 46 are computed using a bottleneck autoencoder and the open source files 72 of each supported programming language. The autoencoder is a modification of a neural machine translation model where a bottleneck is introduced between the encoder and decoder blocks. The transformer based model uses convolutional layers to create the bottleneck on the encoder output before it is fed to the decoder. The first step in the generation of reference source code embeddings 46 is to convert the input code (e.g., the publicly-available open source code 72) into a sequence of integers of a maximum length of 2560 by a tokenizer. The tokenizer may consider only the top 5000 most frequent source code symbols in the files 72. These sequences are then encoded into sequences of 128 floating point numbers by the encoder. The decoder uses these short sequences to regenerate the original sequence of tokens that represent code. After training, the encoder alone is used to compute the reference source code embeddings 46 representing the publicly-available open source code 72. The reference source code embeddings 46 are then used to identify how different a given source file is from the open source files in the training corpus via clustering.

While any training data 74 may be used, the publicly-available open source code 72 especially reveals the proprietary programming 70. Because the encoder is trained using only the publicly-available open source code 72, no client/customer coding is required for the training process. After the training process, the source code similarity service 20 generates one (1) encoder model (e.g., the machine learning model 44) per programming language family. Note that the machine learning model 44 is not customer specific and may be updated periodically (say monthly) with the newest popular open source code. The machine learning model 44 is downloaded to the cyber security agents 38 to compute the agent embeddings 42. The cyber security agents 38 then uploaded their respective agent embeddings 42 to the cloud computing environment 22 for further processing. The machine learning model 44, for example, may be relatively small with the encoder having 1.7 million parameters. Since the agent embeddings 42 are computed by the sensory cyber security agents 38, a small encoder is an advantage.

FIG. 20 illustrates still more examples of service details. The agent embeddings 42 represent the source code file 24. To estimate the similarity difference of the source code file 24 from the publicly-available open source code 72, the agent embeddings 42 are generated as a compressed representation of the source code file 24. The agent embeddings 42 are computed by the cyber security agent 38 executing the machine learning model 44. However, the machine learning model 44 was previously trained and distributed by the cloud computing environment. The agent embeddings 42 are computed using an encoder model that is based on the transformer architecture of deep neural networks. To train the encoder model, first an autoencoder model is trained using only the publicly-available open source code 72. The first few layers of the autoencoder comprises the encoder model and its output is the reference source code embeddings 46. For any pair of source files, embeddings computed using this encoder are similar when the files themselves are similar and dissimilar when the files are dissimilar. Hence if the agent embeddings 42 (representing the customer's source code file 24) are different from the reference source code embeddings 46 (representing the publicly-available open source code 72), then the source code file 24 is determined to be a unique version of the computer source code 60 and the proprietary programming 70. Because only the compressed embedding representation of the source code file 24 is uploaded to the cloud computing environment 22, concerns about exposing the proprietary programming 70 are mitigated.

While the agent embeddings 42 may be processed by any member of the cloud computing environment 22, for simplicity FIG. 20 illustrates the agent embeddings 42 routing via the cloud computing environment 22 to a network address (e.g., IP address) associated with a cloud source code server 160. The cloud computing environment 22 has thus assigned or tasked the cloud source code server 160 with coordinating, or even providing, the source code similarity service 20 and/or the file centrality service 110. The cloud source code server 160 stores a source code analysis software application 162 in a memory device 164. The cloud source code server 160 has a hardware processor 166 that stores and executes the source code analysis software application 162. The source code analysis software application 162 instructs or causes the cloud source code server 160 to generate the reference source code embeddings 46 that represent the publicly-available open source code 72. The source code analysis software application 162 also instructs or causes the cloud source code server 160 to compare the agent embeddings 42 to the reference source code embeddings 46 and to generate the source code similarity decision 48. The source code analysis software application 162 may also instruct or cause the cloud source code server 160 to generate the centrality measures 130 and to generate the source code source code similarity decision 48. The source code analysis software application 162 may then send the source code source code similarity decision 48 to a network address (e.g., IP address) associated with the cyber security agent 38. The source code analysis software application 162 may then send the centrality measures 130 to the cyber security agent 38. The cyber security agent 38 and the source code analysis software application 162 may thus cooperate, perhaps in a client/server fashion, to provide the source code similarity service 20 and the file centrality service 110.

The file centrality service 110 may thus acquire the version control information 114. The version control information 114 may be proprietary or confidential information of the client/customer. While any networked member of the cloud computing environment 22 may have permissioned credentials to access the version control information 114, for simplicity, the cyber security agent 38 acquires and sends the version control information 114. Because the cyber security agent 38 is installed on the customer's computer systems 28 (again illustrated as the laptop computer 30), the cyber security agent 38 may acquire and send the version control information 114. The cyber security agent 38 may thus send the version control information 114 to the cloud computing environment 22, and the cloud computing environment 22 routes the version control information 114 to the network address (e.g., IP address) associated with the cloud source code server 160. When the cloud source code server 160 receives the version control information 114, the source code analysis software application 162 may generate the centrality measures 130 and determine the centrality importance 112 associated with the source code file 24 (as this disclosure previously explained).

The file centrality service 110 helps identify programming crown jewels. The file centrality service 110 uses the centrality measures 130 to compute a list of important source code files, as revealed by the version control information 114. The centrality measures 130 of a source code file indicate how important they are relative to other source code files in the company source code. To compute the centrality measures 130 of source code files, the centrality graph (as explained with reference to FIG. 16) may be constructed with the source code files 24 and users who worked on them, as nodes. A user node is linked to a source code file node if the user authored the file or reviewed a change in that file. A file node is linked to another file node if the file imports or includes the other. Algorithms such as the page rank 132 can be used to compute the centrality of files on such a graph. All information regarding file to file linkages and user to file linkages are found while scanning the code folders on local machines and do not require access to the company source control management servers. Any source file that is found to be dissimilar to open source files and also to have centrality measures 130 beyond a centrality threshold 168 may be reported as being important.

Figure 21:
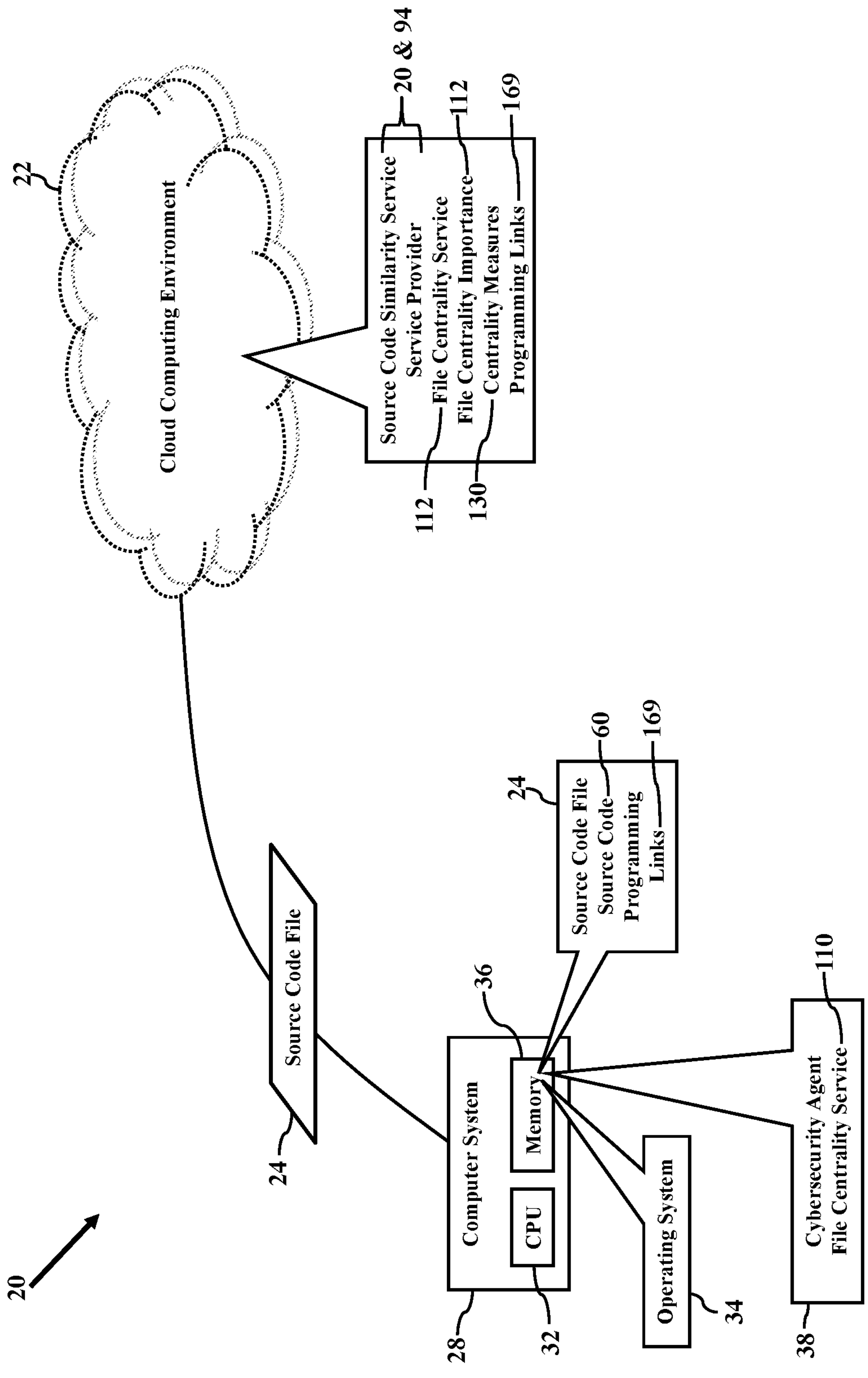
FIGS. 21-23 illustrate yet more examples of file centrality.
Figure 22:
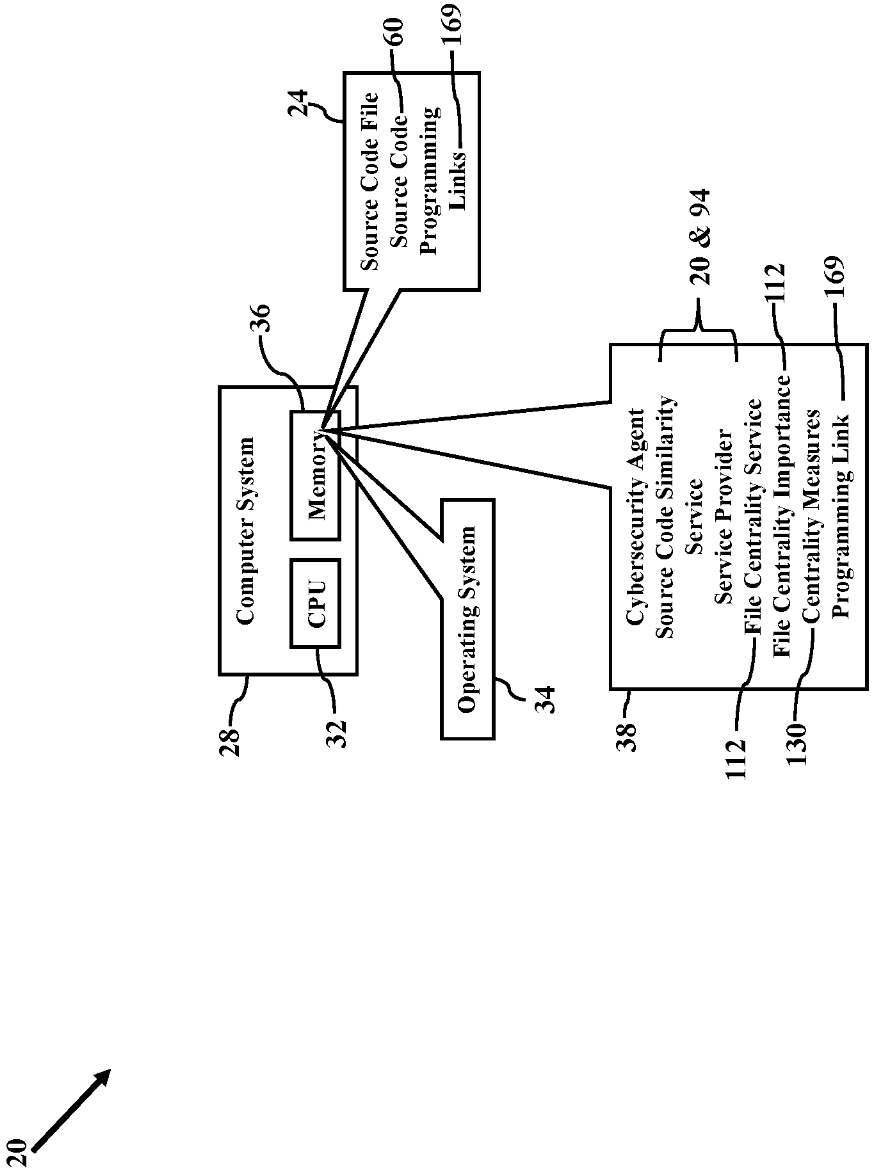
Figure 23:
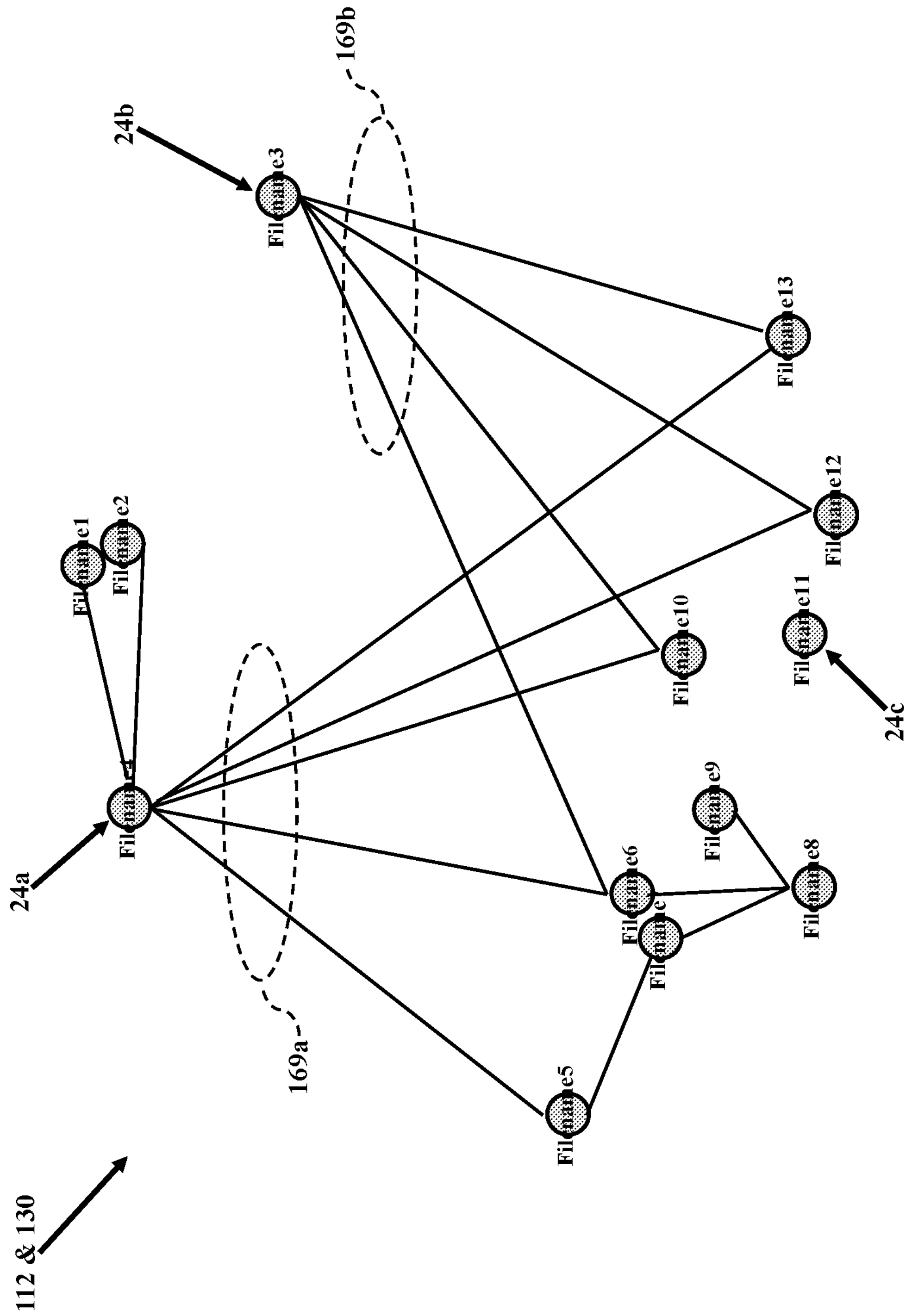

FIGS. 21-23 illustrate yet more examples of the file centrality service 110. In these examples, the file centrality service 110 may utilize relationships between different source code files 24. While the file centrality service 110 may utilize any relationship between different source code files 24, FIGS. 21-23 illustrate programming links 169 to other source code files. Even though the source code file 24 may include or be associated with the source code 60, the source code 60 may include or be associated with the programming links 169 to other, inter-file or external source code files. The file centrality service 110, in other words, may determine the file centrality importance 112 without obtaining user information and/or without the version control information 114. As an example, the file centrality service 110 may determine the file centrality importance 112 based on linked files based on imports, includes, references, paths, pointers, and other programming links 169. The file centrality service 110 may thus be anonymous and need not utilize the version control information 114 (such as when the version control information 114 is unavailable, unwanted, or not included). The file centrality service 110, for example, may analyze compiled object files that are linked or flagged together during a build environment. The file centrality service 110 may analyze libraries and API statements. The file centrality service 110 may analyze hard/soft links to directories, files, and/or remote computers. The file centrality service 110 may analyze calls to other source code files. Any relationships between different source code files 24 may thus be represented as the programming links 169. In FIG. 21, for example, the cybersecurity agent 38 may interface with the operating system 34 and cause or instruct the computer system 28 to upload the source code file 24 to the cloud computing environment 22 for remote/cloud analysis of the programming links 169. FIG. 22 illustrates another example of local analysis, in which the cybersecurity agent 38 may read and inspect the programming links 169 associated with the source code file 24. FIG. 23 thus illustrates yet another example of a source file graph showing the programming links 169 between different source code files 24. FIG. 23, in particular, illustrates the programming links 169*a* associated with source code file 24*a* and the programming links 169*b* associated with source code file 24*b*. FIG. 23 thus illustrates that a mere count or tally of the programming links 169 associated with the corresponding source code file 24 may indicate the file centrality importance 112. The source code file 24*a*, for example, is associated with five (5) programming links 169*a*, while source code file 24*b* is associated with four (4) programming links 169*b*. Source code file 24*c*, though, has zero (0) programming links. A simple sum of the programming links 169 associated with the corresponding source code file 24 may thus be used as a simple indicator (e.g., high/low) of the file centrality importance 112. By using these programming links 169 as the centralities measures 130, the file centrality service 110 determines one or more indications of which source code files 24 are central to a customer. In addition to these centrality measures 130, information about the file size 122 and file content entropy may also be stored. Putting all of these together, the file centrality service 110 builds a centrality or a graph that connects linked files to determine if the source code file 24 is central to a customer/client business. The file centrality service 110 may also determines any repository that is also very central to where the source code file 24 resides.

Figure 24:
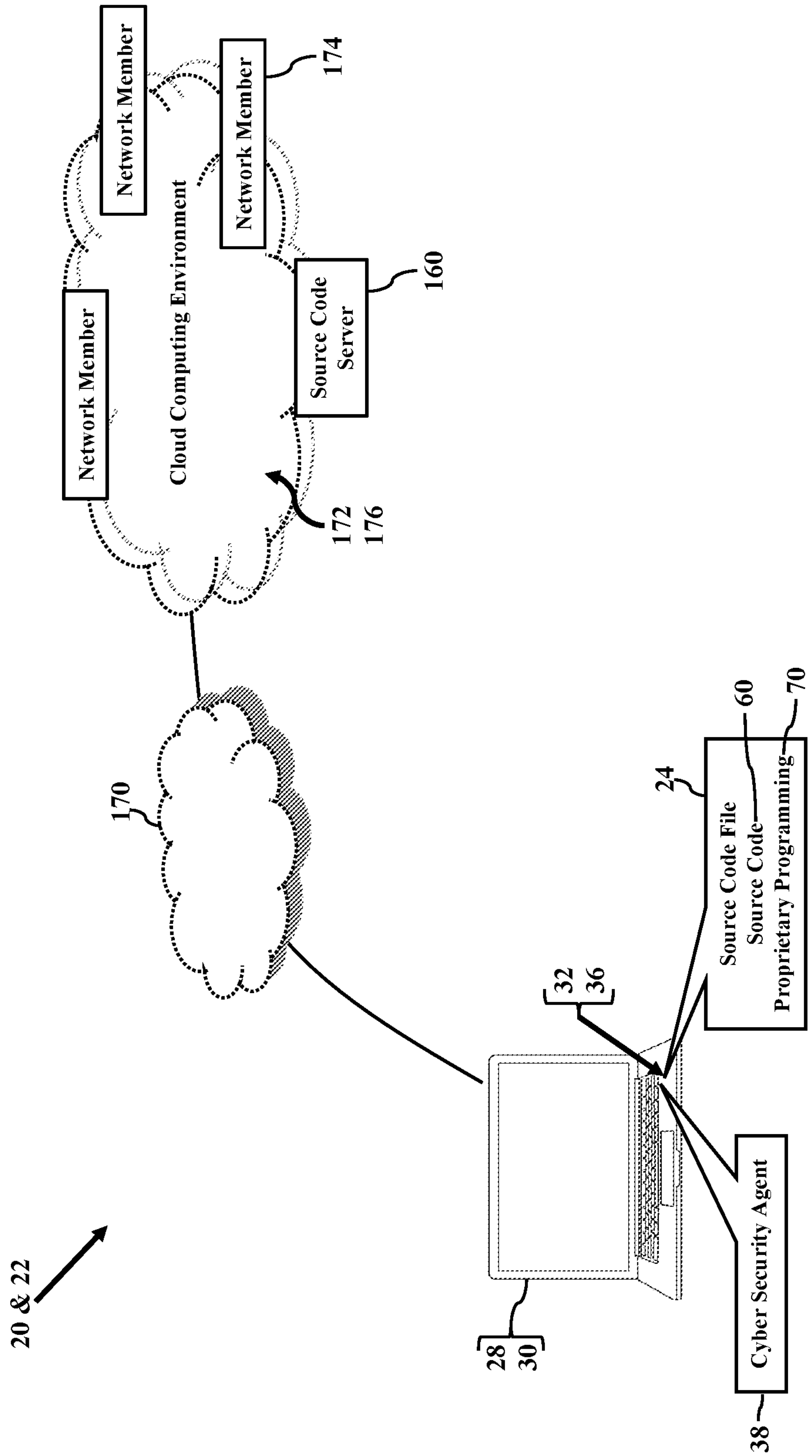
FIG. 24 illustrates still more examples of a cloud computing environment.

FIG. 24 illustrates still more examples of the cloud computing environment 22. In these examples, the computer system 28 (again illustrated as the laptop computer 30) communicates with the cloud computing environment 22. The laptop computer 30 has a network interface to an access network 170, thus allowing the laptop computer 30 to establish network communications with the cloud computing environment 22 and/or with the cloud source code server 160. The laptop computer 30 may store and execute the endpoint cyber security agent 38. The cloud source code server 160 may further communicate via a network interface to a communications network 172 (e.g., public Internet, private network, and/or hybrid network). The cloud source code server 160 may thus communicate with other servers, devices, computers, or other network members 174 operating within, or affiliated with, the cloud computing environment 22. The cloud source code server 160, for example, may be a component of an artificial neural network 176. The artificial neural network 176 may be one or many of the network members 174 operating within, or affiliated with, the cloud computing environment 22. The cloud source code server 160, in particular, interfaces with the cloud computing environment 22 and/or the artificial neural network 176 to provide the source code similarity service 20 and/or the file centrality service 110. The services 90 and 110 are some of perhaps many cloud services provided by the cloud computing environment 22.

The cloud computing environment 22 may analyze bits/bytes of data. The source code analysis software application 162, for example, may instruct the cloud source code server 160 to read the publicly-available open source code 72 and to concatenate some or all of the bits. The source code analysis software application 162 may then instruct the cloud source code server 160 to read n consecutive bits and/or bytes (such as byte n-grams) from the bit/byte strings representing the concatenated publicly-available open source code 72. The source code analysis software application 162 instructs the cloud source code server 160 to store the byte n-grams in the memory device 166, perhaps as a byte buffer. The cloud source code server 160 may then send/feed/load the contents of the byte buffer to the artificial neural network 176. The artificial neural network 176 receives multiple n consecutive bytes (or the byte n-grams) which are sampled from the buffering memory device 166. The artificial neural network 176 uses machine learning (as this disclosure previously explained) to generate the reference source code embeddings 46 from the byte n-grams as inputs, with n being any integer value. The artificial neural network 176 may thus function or perform as an entity embedder and generate the open source code reference source code embeddings 46 as outputs. While the reference source code embeddings 46 may have many different representations, each reference source code embeddings 46 is commonly represented as embedding values associated with an open source embedding vector and/or an open source embedding matrix.

The cyber security agent 38 may similarly generate the agent embeddings 42. The cyber security agent 38 reads the source code file 24 and concatenates some or all of the bits. The cyber security agent 38 may then instruct the operating system 34 to read n consecutive bits and/or bytes (such as byte n-grams) from the bit/byte strings representing the source code file 24. The cyber security agent 38 stores the byte n-grams in its memory device 36, perhaps as a byte buffer. The cyber security agent 38 may then send/feed/load the contents of the byte buffer to the machine learning model 44 to generate the agent embeddings 42. While the agent embeddings 42 may have many different representations, each agent embeddings 42 is commonly represented as embedding values associated with an agent embedding vector and/or an agent embedding matrix representing the source code file 24 locally stored by the laptop computer 30. Additional details for the agent embeddings 42 and the reference source code embeddings 46 are found in U.S. Patent Application Publication 2019/0007434 to McLane, et al. (which has since issued as U.S. Pat. No. 10,616,252) and in U.S. Patent Application Publication 2020/0005082 to Cazan, et al. (which has since issued as U.S. Pat. No. 11,727,112), with each document incorporated herein by reference in its entirety.

Open-source similarities may then be determined. Once the cloud source code server 160 receives the agent embeddings 42 sent by the cyber security agent 38, the source code analysis software application 162 instructs the cloud source code server 160 to compare the agent embeddings 42 to the open source code reference source code embeddings 46. The source code analysis software application 162 may use any similarity scheme, mechanism, technique, or software program module for comparing the agent embeddings 42 to the open source code reference source code embeddings 46. Because the embeddings 42 and 46 may be expressed as vectors, their similarity may be determined using the Euclidean distance between ends of the vectors, the cosine of an angle between the vectors, and/or a dot product of the vectors. Whatever similarity analysis is used, the source code analysis software application 162 may generate the source code similarity decision 48. The source code analysis software application 162 instructs the cloud source code server 160 to send the source code similarity decision 48 back to the cyber security agent 38 installed to the laptop computer 30.

The cyber security agent 38 thus provides a nimble and effective endpoint detection and response solution. The source code similarity service 20 and/or the file centrality service 110 may be an endpoint detection and response tool that blocks any nefarious or suspicious activities associated with the source code file 24. The cyber security agent 38, perhaps functioning as an antimalware driver, may be downloaded and installed to any server, switch, router, smartphone, endpoint device, or any other computer system 20. The cyber security agent 38 may continuously monitor any computer system 28 to detect and to respond to any event activity, or operation. The cyber security agent 38, in particular, may monitor for, detect, and/or block suspicious operations, even before online communication is established. The cyber security agent 38 provides cyber security service and detects evidence of misappropriation and exfiltration, even while offline. The cyber security agent 38 may thus be a local endpoint detection and response (EDR) solution.

The cyber security agent 38 may also integrate with an XDR solution. Extended detection and response (XDR) collects threat data from siloed security tools across an organization's technology stack. The cyber security agent 38, when online, may upload the agent embeddings and/or the version control information from the host computer system 28 (e.g., the laptop computer 30) to the cloud-computing environment 22. Any data uploaded from the cyber security agent 38 may then be unified/merged with other data collected from other platforms, perhaps filtered and condensed into a single console.

Figure 25:
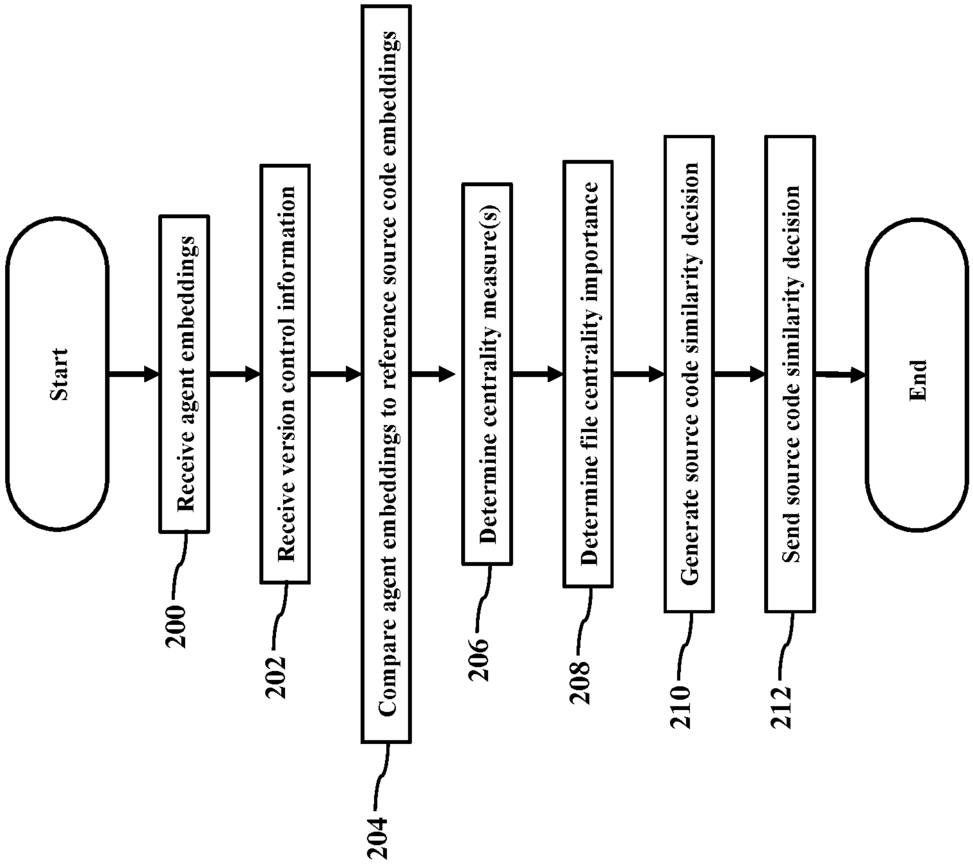
FIG. 25 illustrates examples of a method or operations for source code similarity.

FIG. 25 illustrates examples of a method or operations for source code similarity. The agent embeddings 42 are received that represent the source code file 24 (Block 200). The version control information 114 is received (Block 202). The agent embeddings 42 are compared to the reference source code embeddings 46 representing the publicly-available open source code 72 (Block 204). The centrality measure 130 (Block 206) and the file centrality importance 112 (Block 208) are determined. The source code similarity decision 48 is generated (Block 210) and sent to the cyber security agent 38 (Block 212).

Figure 26:
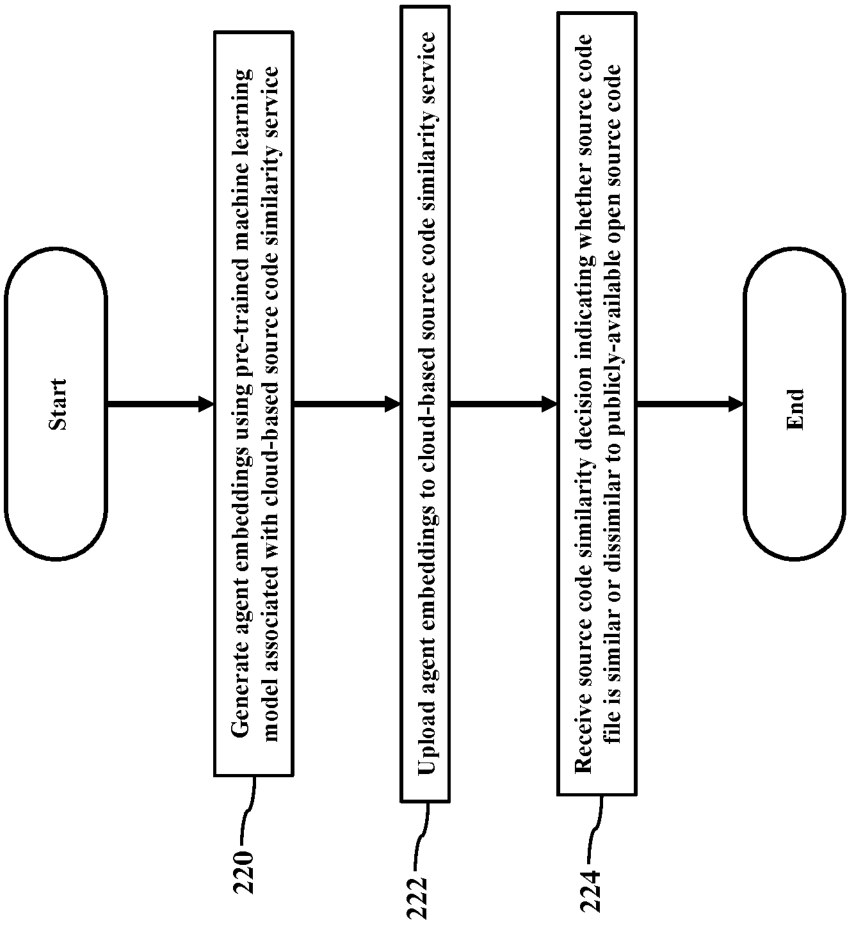
FIG. 26 illustrates more examples of a method or operations that identifies the source code file.

FIG. 26 illustrates more examples of a method or operations that identifies the source code file 24. The agent embeddings 42 are generated using the pre-trained machine learning model 44 associated with the cloud-based source code similarity service 20 (Block 220). The agent embeddings 42 are uploaded to the cloud-based source code similarity service 20 (Block 222). The source code similarity decision 48 is received that indicates whether the source code file 24 is similar or is not similar to the publicly-available open source code 72 (Block 224).

Figure 27:
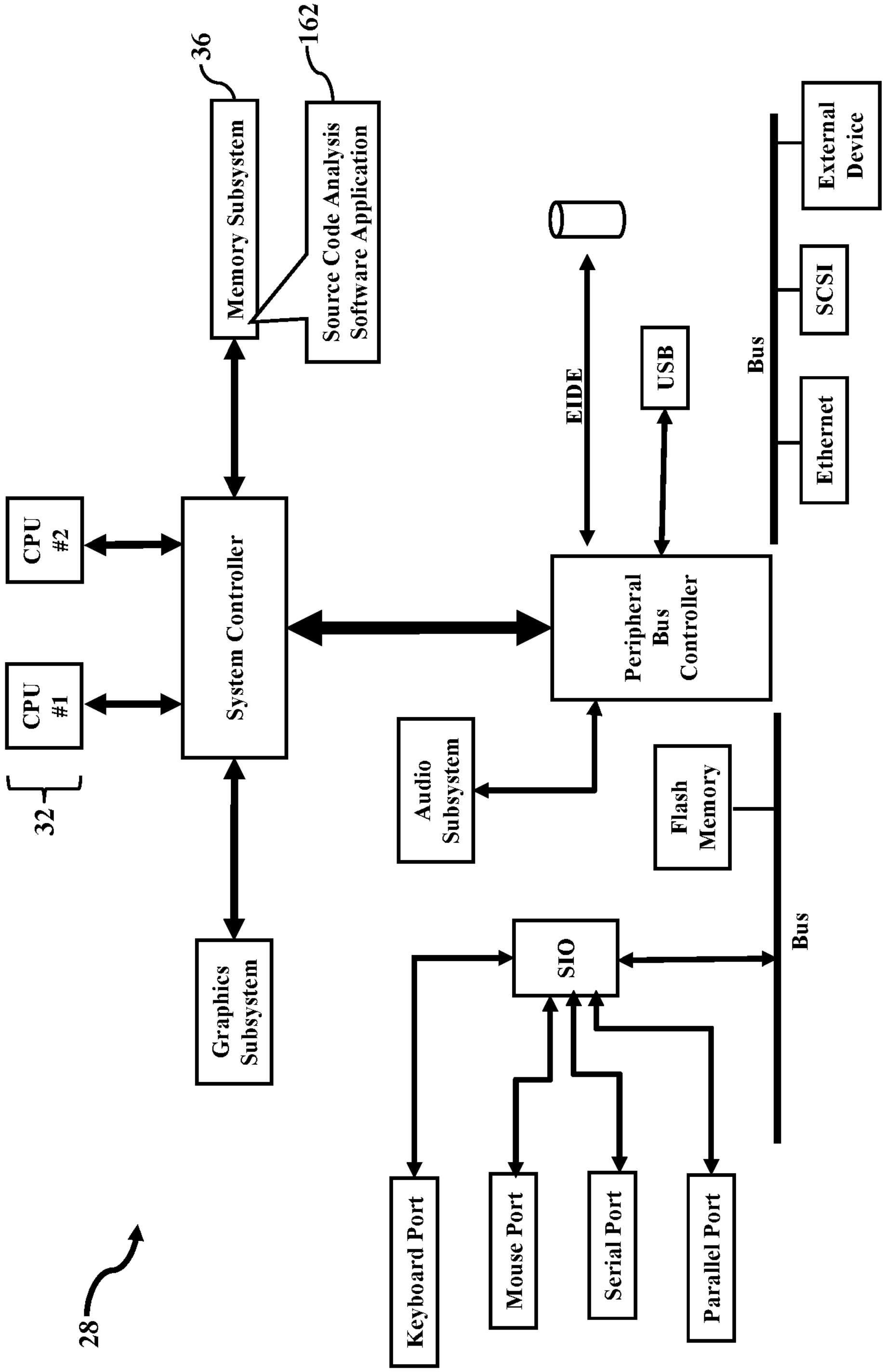
FIG. 27 illustrates a more detailed example of the operating environment.

FIG. 27 illustrates a more detailed example of the operating environment. FIG. 27 is a more detailed block diagram illustrating the computer system 28. The source code analysis software application 162 is stored in the memory subsystem or device 36. One or more of the hardware processors 32 communicate with the memory subsystem or device 36 and execute the source code analysis software application 162. Examples of the memory subsystem or device 36 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer system 28 is known to those of ordinary skill in the art, no detailed explanation is needed.

The computer system 28 may have any embodiment. This disclosure mostly discusses the computer system 28 as the laptop computer 30. The source code similarity service 20 and the file centrality service 110, however, may be easily adapted to mobile computing, wherein the computer system 28 may be the smartphone, a server, a switch/router, a tablet computer, or a smartwatch. The source code similarity service 20 and the file centrality service 110 may also be easily adapted to other embodiments of smart devices, such as a television, an audio device, a remote control, and a recorder. The source code similarity service 20 and the file centrality service 110 may also be easily adapted to still more smart appliances, such as washers, dryers, and refrigerators. Indeed, as cars, trucks, and other vehicles grow in electronic usage and in processing power, the source code similarity service 20 and the file centrality service 110 may be easily incorporated into any vehicular controller.

The above examples of the services 20 and 110 may be applied regardless of communications networking technology and networking environment. The services 20 and 110 may be easily adapted to stationary or mobile devices having wide-area networking (e.g., 4G/LTE/5G/6G cellular), wireless local area networking (WI-FI®), near field, and/or BLUETOOTH® capability. The services 20 and 110 may be applied to stationary or mobile devices utilizing any portion of the electromagnetic spectrum and any signaling standard (such as the IEEE 802 family of standards, GSM/CDMA/TDMA or any cellular standard, and/or the ISM band). The services 20 and 110, however, may be applied to any processor-controlled device operating in the radio-frequency domain and/or the Internet Protocol (IP) domain. The services 20 and 110 may be applied to any processor-controlled device utilizing a distributed computing network, such as the Internet (sometimes alternatively known as the "World Wide Web"), an intranet, a local-area network (LAN), and/or a wide-area network (WAN). The services 20 and 110 may be applied to any processor-controlled device utilizing power line technologies, in which signals are communicated via electrical wiring. Indeed, the many examples may be applied regardless of physical componentry, physical configuration, or communications standard(s).

The environment may utilize any processing component, configuration, or system. For example, the services 20 and 110 may be easily adapted to execute by any desktop, mobile, or server central processing unit 32 or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 28 may even use multiple central processing units 32 or chipsets, which could include distributed processors or parallel processors in a single machine or multiple machines. The central processing unit 32 or chipset can be used in supporting a virtual processing environment. The central processing unit 32 or chipset could include a state machine or logic controller. When any of the central processing units 32 or chipsets execute instructions to perform "operations," this could include the central processing unit or chipset performing the operations directly and/or facilitating, directing, or cooperating with another device or component to perform the operations.

The services 20 and 110 may use packetized communications. When the computer system 28 and the cloud computing environment 22 communicate, information may be collected, sent, and retrieved. The information may be formatted or generated as packets of data according to a packet protocol (such as the Internet Protocol). The packets of data contain bytes of data describing the contents, or payload, of a message. A header of each packet of data may be read or inspected and contain routing information identifying an origination address and/or a destination address.

The services 20 and 110 may utilize any signaling standard. The cloud-computing environment 22 may mostly use wired networks to interconnect the network members 174. However, the cloud-computing environment 22 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud-computing environment 22 may also utilize other standards, such as the I.E.E.E. 802 family of standards, the Industrial, Scientific, and Medical band of the electromagnetic spectrum, BLUETOOTH®, low-power or near-field, and any other standard or value.

The services 20 and 110 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for determining source code similarity, as the above paragraphs explain.

The diagrams, schematics, illustrations, and tables represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method, comprising:

receiving, by a server, agent embeddings generated by a cyber security agent suspending a host's kernel activity, the agent embeddings representing a source code file detected by the host's kernel activity;

determining, by the server during the suspending of the host's kernel activity, an embedding dissimilarity between the agent embeddings generated by the cyber security agent and reference source code embeddings representing publicly-available open source code; and in response to the embedding dissimilarity, denying, by the server, an exfiltration of the source code file by blocking the host's kernel activity.

2. The method of claim 1, further comprising prompting an artificial intelligence model using the source code file.

3. The method of claim 1, further comprising blocking operating system events associated with the source code file.

4. The method of claim 1, further comprising quarantining the source code file.

5. The method of claim 1, wherein in response to the determining of the embedding dissimilarity, further comprising determining the source code file represents proprietary programming.

6. The method of claim 1, further comprising:

in response to the embedding dissimilarity, determining a file centrality importance associated with the source code file based on graphical data representing users as nodes and representing programming links between the source code file and the users as edges.

7. The method of claim 6, further comprising determining the file centrality importance associated with the source code file based on a page rank associated with the graph.

8. The method of claim 1, further comprising distributing a pre-trained machine learning model to the cyber security agent, the pre-trained machine learning model trained using the publicly-available open source code.

9. The method of claim 1, further comprising determining a centrality measure associated with the source code file.

10. The method of claim 1, further comprising determining a centrality importance associated with the source code file, the centrality importance based on version control information.

11. A method, comprising:
receiving, by a cyber security agent monitoring a host operating system (OS) kernel, a kernel notification sent by the host (OS) kernel detecting kernel-level activity associated with a source code file;
in response to the kernel notification, suspending, by the cyber security agent, the kernel-level activity associated with the source code file;
during the suspending of the kernel-level activity, locally generating, by the cyber security agent cooperating with the host OS kernel, agent embeddings representing the source code file by using a locally-stored pre-trained machine learning model associated with a cloud-based source code similarity service;
during the suspending of the kernel-level activity, uploading, by the cyber security agent cooperating with the host OS kernel, the agent embeddings to the cloud-based source code similarity service;
during the suspending of the kernel-level activity, receiving, by the cyber security agent cooperating with the host OS kernel, an embedding dissimilarity generated by the cloud-based source code similarity service based on the agent embeddings; and
in response to the embedding dissimilarity, blocking, by the cyber security agent, the kernel-level activity associated with source code file.

12. The method of claim 11, further comprising receiving version control information associated with the source code file.

13. The method of claim 11, further comprising determining a centrality measure using the version control information associated with the source code file.

14. The method of claim 11, further comprising determining a centrality importance associated with the source code file, the centrality importance based on version control information.

15. The method of claim 11, further comprising instructing the host operating system kernel to block operating system events associated with the source code file.

16. The method of claim 11, wherein in response to the receiving of the embedding dissimilarity, further comprising determining the source code file represents proprietary programming.

17. The method of claim 11, wherein in response to the receiving of the embedding dissimilarity, further comprising determining the source code file represents an intellectual property.

18. A memory device storing instructions that, when executed by a central processing unit, perform operations, the operations comprising:
storing, by a cyber security agent monitoring a host operating system (OS) kernel, a pre-trained machine learning model associated with a cloud-based source code similarity service using publicly-available open source code;
receiving, by the cyber security agent, a kernel notification sent by the host OS kernel detecting kernel activity associated with a source code file;
in response to the kernel notification, suspending, by the cyber security agent cooperating with the host OS kernel, the kernel activity associated with the source code file;
generating, by the cyber security agent cooperating with the host OS kernel, an agent embedding vector associated with the source code file by using the pre-trained machine learning model;
uploading, by the cyber security agent cooperating with the host OS kernel, the agent embedding vector to the cloud-based source code similarity service;
receiving, by the cyber security agent cooperating with the host OS kernel, an embedding dissimilarity generated by the cloud-based source code similarity service indicating the agent embedding vector is dissimilar to the publicly-available open source code; and
in response to the receiving of the embedding dissimilarity, denying an exfiltration of the source code file by blocking, by the cyber security agent, the kernel activity associated with the source code file.

19. The memory device of claim 18, wherein the operations further comprise receiving version control information associated with the source code file.

20. The memory device of claim 18, wherein the operations further comprise determining a centrality importance associated with the source code file, the centrality importance based on version control information.

* * * * *